United States Patent [19]

Ozawa et al.

[11] Patent Number: 4,901,090

[45] Date of Patent: Feb. 13, 1990

[54] INKED SHEET CASSETTE AND THERMAL TRANSFER-TYPE RECORDING APPARATUS

[75] Inventors: Naohiro Ozawa; Hiroshi Shimizu, both of Yokohama; Toshihiko Gotoh, Tokyo; Kentaro Hamma, Yokohama; Seizi Okunomiya, Katsuta; Takeshi Nomura; Mikio Shiraishi, both of Yokohama, all of Japan

[73] Assignee: Hitachi, Ltd., Tokyo, Japan

[21] Appl. No.: 181,098

[22] Filed: Apr. 13, 1988

[30] Foreign Application Priority Data

| | | | |
|---|---|---|---|
| Apr. 13, 1987 | [JP] | Japan | 62-88810 |
| Apr. 30, 1987 | [JP] | Japan | 62-104253 |
| May 20, 1987 | [JP] | Japan | 62-121209 |

[51] Int. Cl.[4] .............. G01D 15/10

[52] U.S. Cl. .............. 346/76 PH; 400/120

[58] Field of Search .............. 346/76 PH; 400/120 PH

[56] References Cited

U.S. PATENT DOCUMENTS 4,622,563 11/1986 Watanabe .............. 346/76 PH

FOREIGN PATENT DOCUMENTS 0023064 2/1985 Japan .............. 346/76 PH 0229575 10/1986 Japan .............. 400/120

*Primary Examiner*—Teresa J. Walberg

*Assistant Examiner*—Huan Tran

*Attorney, Agent, or Firm*—Antonelli, Terry & Wands

[57] ABSTRACT

An inked sheet cassette suitable for use in printer such as a multi-color thermal transfer-type printer. The cassette has a cassette case encasing an inked sheet constituted by a thin web-like film or paper sheet with at least one type of ink applied thereto, and a pair of reels disposed in the cassette case and constituting a supply reel and a take-up reel on which are wound the respective ends of the inked sheet. The cassette has a window provided at least in one of a portion of said cassette case adjacent to the supply reel and portion adjacent to said take-up reel so as to enable the user to visually check the diameter of the roll of the inked sheet on the reel adjacent to said window. Disclosed also is a printer suitable for use in combination with this cassette.

23 Claims, 36 Drawing Sheets

INKED SHEET CASSETTE AND THERMAL TRANSFER-TYPE RECORDING APPARATUS

BACKGROUND OF THE INVENTION

The present invention relates to an ink paper sheet cassette which houses a web-type medium such as an ink paper sheet (referred to as inked sheet, hereinunder) for use in thermal transfer-type recording apparatus such as a printer. The invention also is concerned with a thermal transfer-type recording apparatus (which may be referred to as printer, hereinunder) which is suitable for use in combination with such a cassette.

Various methods have been proposed for mounting an inked sheet on printers which perform printing of letters and images or picture patterns by means of such an inked sheet, and actually carried out in various types of printers and typewriters which make use of such an inked sheet. For instance, Japanese Patent Unexamined Publication No. 56-67278 discloses a system for mounting a wide inked sheet readily. This system includes a supply reel for supplying an inked sheet and a take-up reel for taking up the inked sheet, wherein both reels are accommodated in a single cassette. A pressing roller is provided for the purpose of superposing and pressing the inked sheet on a recording paper sheet at the time of printing. The supply reel and the take-up reel are drivingly connected to each other through a rotation transmitting means so that the inked sheet is fed in synchronization with the printing operation.

Nowadays, various types of printers are used to comply with various demands and a variety of types of recording mediums are used such as ordinary or plain paper sheets, transparent sheets for OHP (Over-Head Projector), tack-seal papers and so forth. There are also a lot of printing requirements or conditions such as high-speed printing, low-speed printing, color printing and monochromatic printing, and so forth. This has given rise to the demand for development of inked sheets having various characteristics suited to these printing requirements or conditions. Inked sheets of different sizes are also required to conform with the sizes of the recording paper sheets.

The known system mentioned above requires that the user mounts and demounts the ink cassette on and from a printer so as to make selective use of a plurality of ink cassettes which may be of different types. In addition, no means has been provided for enabling the user to know the state of use of the inked sheet, e.g., the amounts of the available inked sheet remaining in the cassettes.

SUMMARY OF THE INVENTION

Accordingly, an object of the present invention is to provide an inked sheet cassette which meets the following requirements (1) to (3) without losing interchangeability or compatibility with conventional existing cassettes, as well as a thermal transfer-type printer suitable for use with such a cassette:

(1) Capable of displaying or, at least, detecting the characteristics of the ink on the inked sheet in the cassette now used.

(2) Enables a printer to operate with different types of ink cassettes having inked sheets of different widths.

(3) Capable of enabling the user to visually check the amount of the inked sheet in the cassette.

According to the invention, these requirements are met by a cassette and a printer having the following features.

(1) The inked sheet cassette is provided with indicating means arranged to operate in a direction to be inserted when the cassette is inserted into the printer so as to indicate the characteristics of the ink, while the printer is provided with detection means arranged to operate in the insertion direction when the ink cassette is inserted so as to detect the characteristics of the ink on the inked sheet in the cassette, as well as control means operable in response to the detected ink characteristics.

(2) The printer is provided with locating or positioning means for locating or positioning the inked sheet cassette, while the cassette is provided with a plurality of receiving means which are arranged at positions successively offset in the direction of the width of the inked sheet so as to be engaged by the locating means.

(3) At least one of the side walls of the inked sheet cassette is provided with a window.

When the inked sheet cassette is inserted into the printer, the detecting means on the printer detects the characteristics or property of the ink indicated by the indicating means on the cassette. The control means then operates to control the operation of the printer such that the printer performs the recording operation with recording characteristics which are optimum for the characteristics of the ink on the inked sheet in the cassette now mounted in the printer. The detection of the ink characteristics and the control of the recording or printing operation are performed each time the ink paper sheet cassette is changed.

A correct insertion of the inked sheet cassette into the printer brings one of the receiving means on the cassette into engagement with the locating means of the printer, whereby the inked sheet cassette is precisely located on the printer. Since the inked sheet cassette has a plurality of receiving means which are provided at different positions, the inked sheet cassette is adaptable to different types of printers having the locating means disposed at different positions. The window formed in one of the side walls of the inked sheet cassette enables the user to visually check the increment of diameter of the inked sheet rolled on the take-up reel or the decrement of the roll diameter on the supply reel, thus informing the user of the amount of available inked sheet remaining in the sheet cassette.

DESCRIPTION OF THE PREFERRED EMBODIMENTS

Preferred embodiments of the present invention will be described hereinafter with reference to the accompanying drawings.

Figure 1:
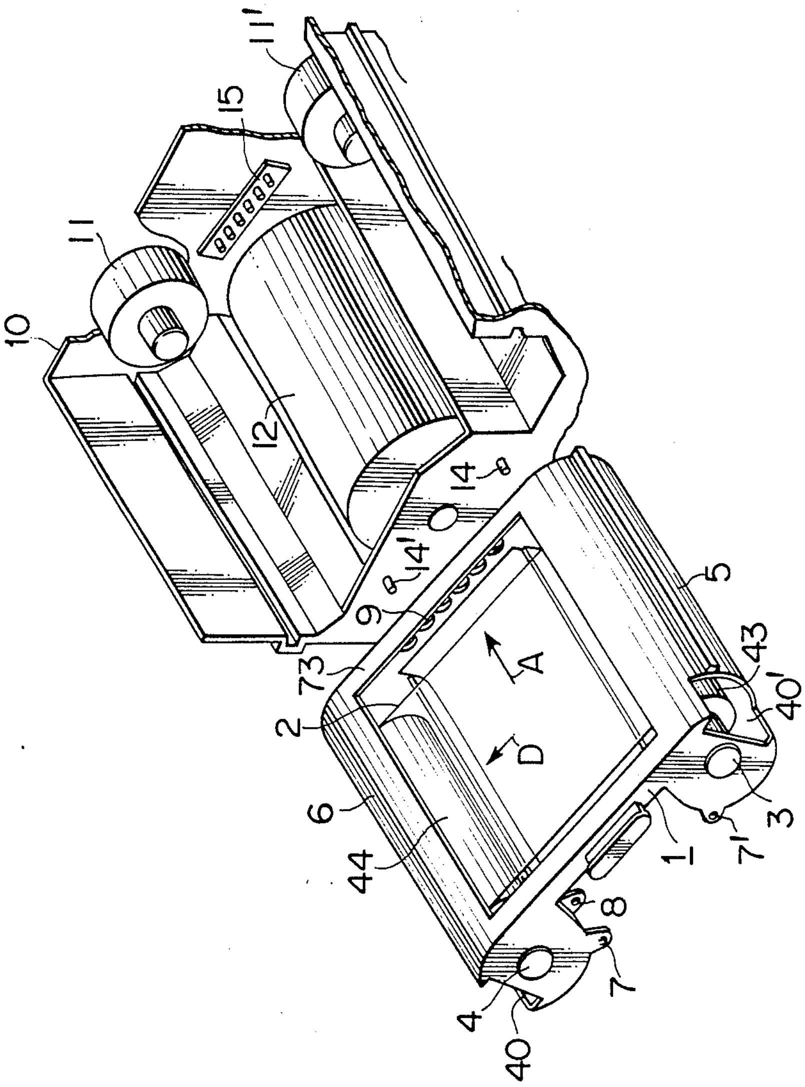
FIG. 1 is a perspective view of the combination of a printer and an inked sheet cassette which are arranged in accordance with the present invention.

Referring first to FIG. 1, an embodiment of an inked sheet cassette in accordance with the present invention has a pair of hollow drum-shaped portions 5 and 6, and a pair of bridge members 73 which interconnect the reel-receiving drum-shaped portions 5, 6. The drum-shaped portion 5 rotatably receives a supply reel 3 on which unused portion of an ink sheet 2 is rolled. This drum-shaped portion therefore will be referred to as supply-reel housing portion 5. On the other hand, the drum-shaped portion 6 rotatably receives a take-up reel 4 on which used portion of an inked sheet 2 is taken-up and rolled. This drum-shaped portion 6 therefore will be referred to as a take-up-reel housing portion 6. The inked sheet 2 has one surface on which are formed three successive and repetitional regions of ye (Yellow), Mg (magenta) and Cy (cyan) colors, each region having the same area as one frame of the print. These regions are progressively consumed so that the inked sheet is successively supplied from the supply reel 3 and taken-up by the take-up reel 4. The inked sheet cassette 1 is provided with a plurality of holes 9 formed in one of the bridge members which is on the inner side as viewed in the direction of insertion indicated by an arrow A. These holes 9 in combination represent the characteristics or types of the inked sheet cassette 1 so that they are referred to as characteristic indicator holes. Locating holes 7,7′ are formed in the axial end surfaces of both housing portions 5,6 which are on the outer side as viewed in the direction of insertion shown by the arrow A. The cassette 1 is further provided with locating holes 8,8′ which are offset from the locating holes 7,7′ in the direction of insertion represented by the arrow A. The side wall of each housing portion 5,6 near the outer axial end of each housing portion 5,6 is partly removed so as to provide a window 40 which may be covered by a transparent member.

On the other hand, the cassette mounting portion 10 of a printer for mounting the inked sheet cassette 1 is provided with a pair of torque-transmitting reels 11, 11′ engageable with the take-up reel 4 and the supply reel 3, respectively, and disposed near the inner axial end of a drum 12 of the printer. A characteristics reading portion 15 constituted by a plurality of pins which are effective in reading the characteristics of the inked sheet cassette 1 when the latter is moved in the direction of insertion (arrow A), is provided between the pair of torque-transmitting reels 11, 11′. The cassette mounting portion 10 also has locating pins 14, 14′ provided on the outer axial end surface thereof.

When the inked sheet cassette 1 is inserted into the cassette mounting portion 10, the supply reel 3 and the take-up reel 4 are brought into engagement with the respective torque-transmitting reels 11, 11′. At the same time, the locating pins 14, 14′ on the cassette mounting portion 10 of the printer are engaged by the locating holes 7, 7′. In consequence, the cassette 1 is correctly located with respect to the cassette mounting portion 10, and torque is transmitted from the torque transmitting reel 11 to the take-up reel 4, whereby the inked sheet is fed in the direction of an arrow D. The pins constituting the characteristics reading portion 15 face some of the characteristics indicator holes 9 in the inked sheet cassette. Thus, each pin of the reading portion 15 reads one-bit information depending on the presence or absence of the corresponding characteristics indicator holes 9. The information is judged by print control means 74 (not shown in FIG. 1) which performs a control to enable the printer to operate optimumly for the type of the inked sheet 2 and the sensitivity of the same. The cassette mounting portion 10 of the printer 1 is so designed that it does not interfere with the locating holes 8 during the insertion of the cassette 1, thus facilitating and smoothing the insertion. As the printing proceeds with the inked sheet 2 on the cassette 1, the inked sheet 2 is progressively paid-off from the supply reel 3 and taken-up by the take-up reel 4. In consequence, the diameter of the roll of the inked sheet on the supply reel 3 decreases while the diameter of the roll on the take-up reel increases. The change in the diameter of the roll on each reel can be visually checked through the window 40. Thus, the user can easily check the amount of the available inked sheet remaining on the supply reel 3, thus making sure to avoid any trouble attributable to unexpected exhaustion of the inked sheet 2.

Figure 2:
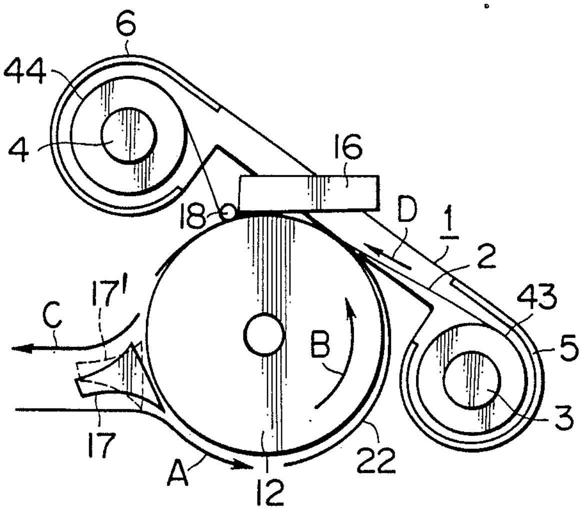
FIG. 2 is a side elevational view of a part of the printer explanatory of the operation thereof.

FIG. 2 is a side elevational view of an essential portion of the printer 19. When the print is commenced, the paper feed/eject member 17 is in the position shown by a solid line so that a print paper 22 is wound on the drum 12 and the inked sheet 2 is superposed on the print paper 22 in accordance with the rotation of the drum 12. Then, a thermal head 16 is pressed onto the inked sheet. The thermal head is provided on the underside thereof a multiplicity of heat-generating elements arranged in a row or line parallel to the axis of the drum 12 so as to provide 512 dots. These elements can be energized independently of one another in accordance with externally supplied recording signals so as to generate heat. In consequence, the ink on the inked sheet is transferred to the print paper 22 in accordance with the amounts of heat generated. This operation is repeated for 640 times during one full rotation of the drum 12 so that a picture information consisting of $512 \times 640$ pixels is formed on the print paper 22 per each rotation of the drum 12. When one full rotation of the drum 12 is completed, the paper feed/eject member 17 is still in the position shown by full line, so that the print paper 12 is overlain by a next region of the ink sheet 2 having a different color. It is recalled that the inked sheet 2 has successive regions of Ye, Mg and Cy colors, each region having an area corresponding to one frame of the recorded image. Thus, the above-described printing operation is repeated for three times, and printing is done by Ye color in the first rotation of the drum 12, in Mg color in the second rotation and in Cy color in the third rotation. When the third rotation is completed, the paper feed-/eject member 17 has been switched to the position shown by a broken line so that the print paper 22 after printing of image in the third color, i.e., Cy color, is ejected instead of being held on the drum 12. In consequence, a tri-color image consisting of $512 \times 640$ pixels is recorded in the print paper 22. Meanwhile, the unused portion of the ink sheet 2 is continuously fed supplied from the supply reel 3 and is extracted as indicated by an arrow D. The thus supplied inked sheet 2 passes under the heat-generating elements of the thermal head so that the ink is selectively transferred onto the print paper. The thus used portion of the inked sheet 2 is then taken-up by the take-up reel 4. As the inked sheet 2 is consumed, the diameter of the roll of the inked sheet 2 on the supply reel 3 is progressively decreased, while the diameter of the roll of the used inked sheet 2 on the take up reel 4 is progressively increased. The user therefore can know the amount of available inked sheet remaining on the supply reel 3, by visually checking either one or both of these diameters.

Figure 3:
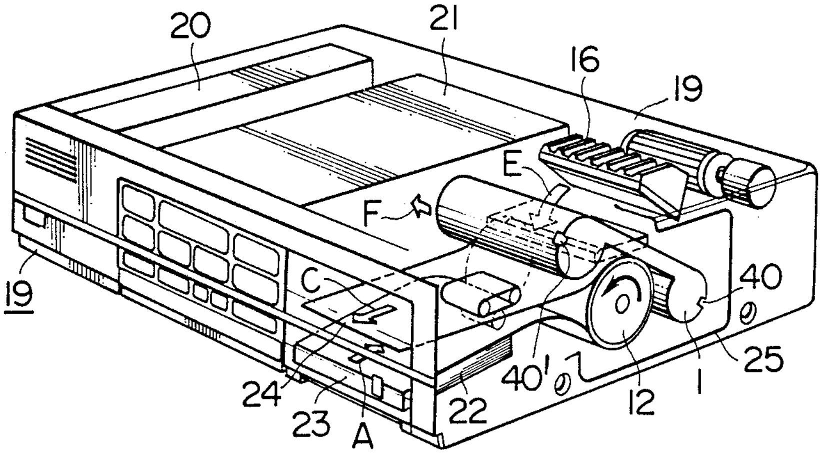
FIG. 3 is a perspective view of the printer illustrating the construction thereof.

FIG. 3 illustrates an example of the printer 19 which is suitable for operation with the inked sheet cassette in accordance with the present invention. A plurality of sheets of print paper 22 are stacked on a paper feed tray 23 and are taken-out in one-by-one fashion and wound on the drum 12. The portion of the inked sheet 2 extracted from the cassette 1 is superposed on the print paper 2 on the drum 12 and is pressed by the thermal head 16 whereby the printing is executed in accordance with the rotation of the drum 12. After the completion of the printing, the print paper 22 is ejected through an ejecting portion. After the insertion of the cassette 1, a cassette lid 25 on the portion of the printer 19 above the drum 12 is closed so that cassette pressing springs (not shown) provided on the cassette lid 25 resiliently presses the cassette 1 thereby fixing the same in the printer 19. The cassette 1 is provided with a window which enables the consumed amount of the inked sheet 2. The portion of the cassette lid 25 corresponding to the window 40 is opened or covered with a transparent shielding member so that the user can visually check the amount of the inked sheet 2 available for further printing. Alternatively, suitable means are provided for informing the printer 19 of the remaining amount of the inked sheet 2 and for enabling the printer 19 to display the remaining amount.

Figure 4A:
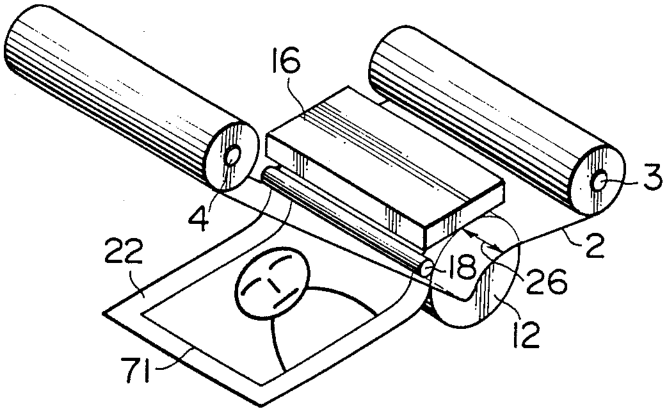
FIGS. 4A and 4B are perspective views of a part of a printer capable of selectively operating with two types of inked sheets having different widths.
Figure 4B:
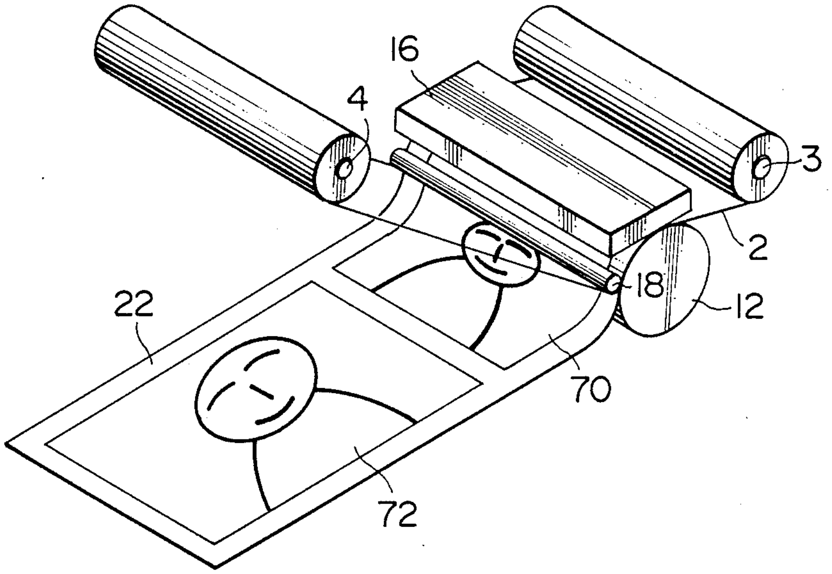

FIGS. 4A and 4B are perspective views of an essential part of different printers 19 of the same construction but having different sizes. It is assumed here that an image of a man having the horizontal length greater than the vertical length is to be printed. The printer 19 shown in FIG. 4A is intended for printing the image in a horizontal posture (this image will be referred to as horizontal picture 71) in which the horizontal length of the image coincides appears in the direction of feed of the print paper. On the other hand, the printer 19 shown in FIG. 4B is designed to print the image in a vertical posture (this image will be referred to as vertical picture 70) in which the horizontal length of the image appears in the direction perpendicular to the direction of feed of the print paper. It will be seen that, in the printer 19 shown in FIG. 4A, the lengths of the thermal head 16 and the drum 12 may be as small as vertical length of the image, whereas the printer 19 shown in FIG. 4B requires that the thermal head 16 and the drum 12 have lengths large enough to cover the horizontal length of the image. Thus, the printer of FIG. 4A designed to print the horizontal picture 71 makes it possible to reduce the lengths of the thermal head 16 and the drum 12, thus contributing to a reduction in the size of the printer, as well as to a reduction in the production cost. When the sizes or areas of the vertical picture 70 and the horizontal picture 71 are the same, the width of the inked sheet 2 required in printing the horizontal picture 71 may be smaller than that necessary for printing the vertical picture 70. From the user's point of view, however, it is troublesome to use different types of inked sheets 2 having different widths. Namely, it is sometimes confusing to select the inked sheet 2 in accordance with the type of the printer 19. On the other hand, it is advantageous for the manufacturer to standardize the size of the inked sheet because they can furnish inked sheet cassettes with inked sheets at a lower cost through mass-production. When such a standard-size cassette 1 with a standard-size inked sheet 2 is used on the printer 19 of FIG. 4A designed for printing the horizontal picture 71, the width of the cassette 1 exceeds the axial lengths of the thermal head 16 and the head 12 and, at the same time, the end portion of the inked sheet 2 having a width denoted by 26 in FIG. 4A is wasted without making any contribution to the printing. This, however, does not cause any substantial problem because the excessive portion of the cassette 1 can be accommodated in the space defined by the cassette lid 25 and the drum 12. It will also be understood that the printer 19 of FIG. 4B designed to print the vertical picture 70 can print, with the inked sheet of the same width, an enlarged horizontal picture 72 by using a print paper of a width corresponding to the horizontal length of the vertical picture 70. It is possible to obtain an enlarged print image, by inverting the dimensional relationship explained above, even when the image has the vertical length greater than the horizontal length.

Figure 5A:
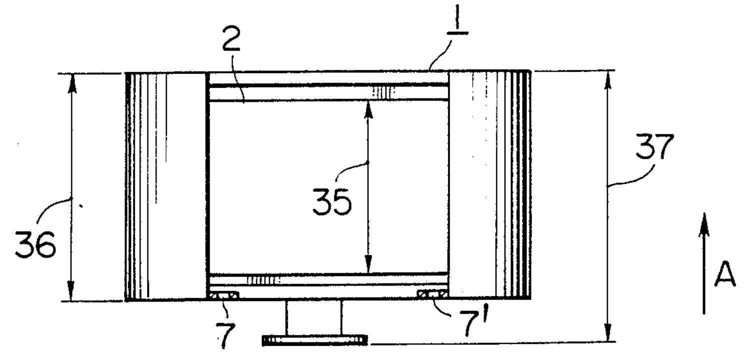
FIGS. 5A, 5B, 5C, 6 and 7 are illustrations of a combination of inked sheet cassettes and a printer which copes with a demand for printing in different printing widths.
Figure 5B:
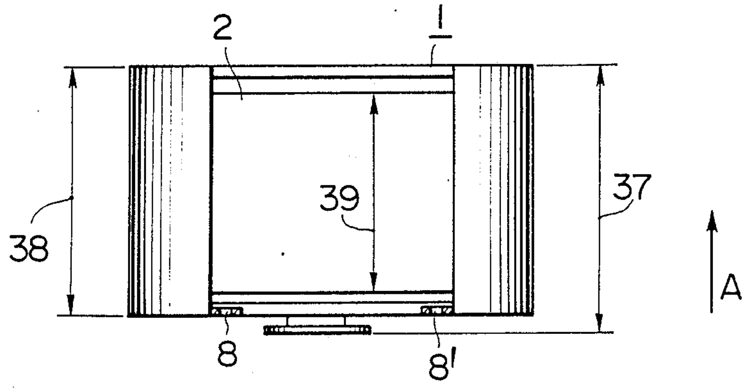
Figure 5C:
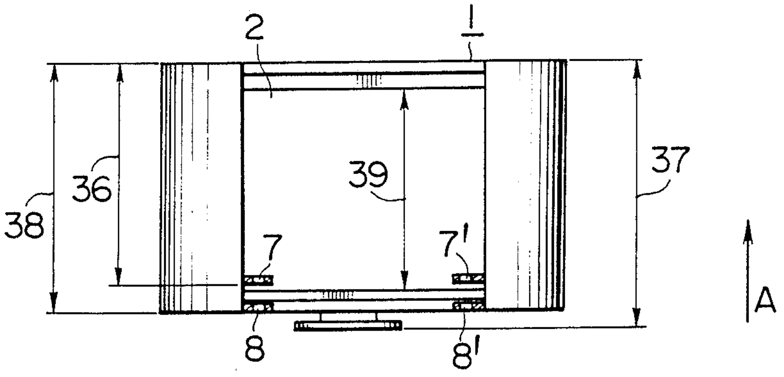

FIGS. 5A to 5C show various types of the inked sheet cassette 1 embodying the present invention.

More specifically, FIG. 5A shows a cassette 1 suitable for use with an inked sheet 2 having a comparatively small width 35. FIG. 5B shows a cassette 1 suitable for use with an inked sheet 2 having a comparatively large width 39. FIG. 5C shows a cassette 1 which has an inked sheet 2 of the greater width 39 but can be used both on the printer specifically designed for the cassette of FIG. 5A and the cassette of FIG. 5B. In the cassette 1 shown in FIG. 5A, the width 35 of the inked sheet 2 is much smaller than the width 37 of the cassette 1. In this case, the locating holes 7, 7' are formed in the cassette 1 such that these locating holes 7,7' are spaced apart from the inner end of the cassette 1 as viewed in the direction of the cassette insertion (arrow A) by a distance 36 greater than the width 35 of the inked sheet. At the same time, the axial length of the drum 12 is determined to be smaller than the distance 36. With such an arrangement, it is possible to print an image on the print paper 22 wound on the drum 12, with the ink sheet 2 of the small width 35. Similarly, in the cassette 1 shown in FIG. 1 having the ink sheet 2 of the greater width 39, locating holes 8,8' are formed in the portion of the cassette 1 spaced from the inner end of the cassette by a distance 38 greater than the sheet width 39. Provided that the width 37 of the cassette of FIG. 5A and that of the cassette of FIG. 5B are the same, both cassettes may be used on a common printer 19. Unfortunately, however, such cassettes may fail to be located precisely due to the different in the position of the locating holes 7,7', 8,8'. In order to obviate such a problem, the cassette 1 shown in FIG. 5C is provided with two types of locating holes 7,7', 8,8' at positions which are spaced by distances 36 and 38, respectively, from the inner end of the cassette 1 as viewed in the direction of insertion. It will be seen that the cassette 1 shown in FIG. 5C can be used commonly both on the printer designed specifically for the cassette of FIG. 5A and the printer specifically designed for the cassette of FIG. 5B. Thus, the design and size of the cassette 1 can be standardized, thus contributing to a reduction in the production cost, while eliminating any confusion of the user in selecting the cassette.

Figure 6:
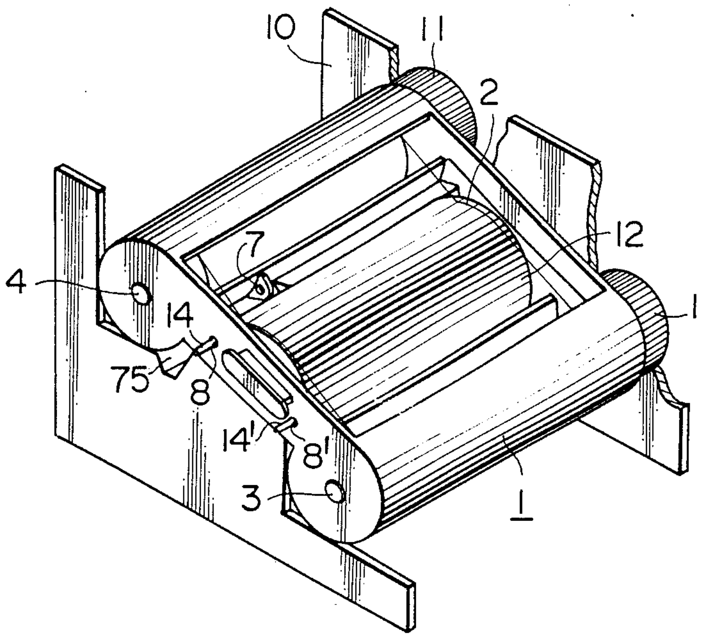

FIG. 6 is a perspective view of the cassette 1 of the type shown in FIG. 5C, mounted on the cassette mounting portion 10 of a printer 19 designed to operate with this cassette 1. This arrangement features a clearing recess 75. During the insertion of the cassette 1, the portion of the ink cassette 1 having the locating hole 7 can move through the clearing recess 75 without being interfered, thus ensuring smooth insertion. On the other hand, the locating holes 8,8' fit on the locating pins 14, thereby to correctly locate the cassette 1.

Figure 7:
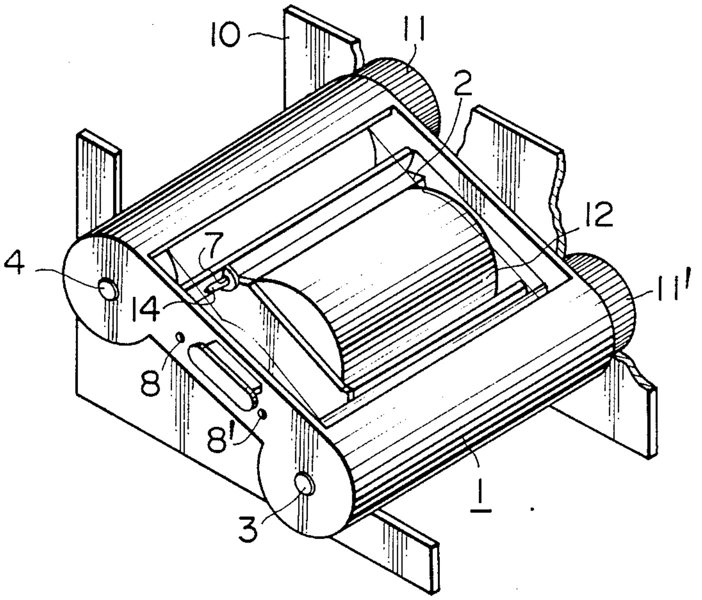

FIG. 7 is a perspective view of the cassette 1 of FIG. 5C mounted in a cassette mounting portion 10 of a printer 19 designed for the cassette 1 shown in FIG. 5A. In this case, the locating pins 14 engage with the locating holes 7,7 so as to correctly locate the cassette 1.

Figure 8:
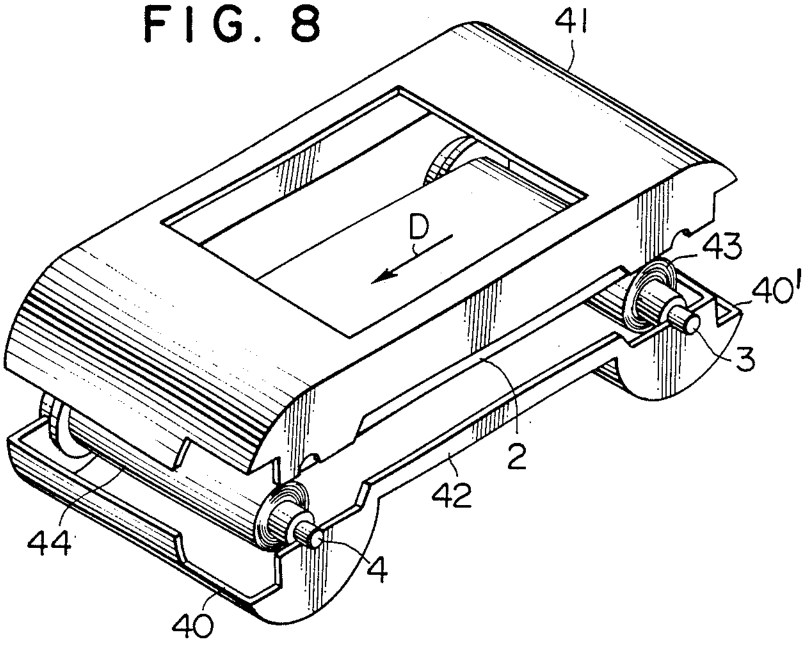
FIG. 8 is a perspective view of an embodiment of the inked sheet cassette before assembly, having a window formed in a side wall thereof.

FIG. 8 shows an embodiment of the inked sheet cassette 1 which is provided with windows 40, 40' for enabling the user to know the amount of available inked sheet 2 remaining in the cassette 1. As explained before, unused inked sheet 2 is rolled on the supply reel 3 and is successively paid-off therefrom and fed in the direction of an arrow D so as to be taken-up by the take-up reel 4. When the cassette 1 is rather new, i.e., when only a small portion of the inked sheet 2 has been used, the diameter of the roll of the inked sheet 2 on the supply reel 3 is comparatively large, while the diameter of the roll on the take-up reel 4 is comparatively small. As the ink sheet 2 is consumed, the diameter of the roll of the unused ink sheet 2 on the supply reel is progressively decreased, while the diameter of the roll of the used inked sheet 2 on the take-up reel 4 is progressively increased. It is therefore possible to confirm the amount of unused portion of the inked sheet available for the further printing, by visually checking and comparing the diameters of the rolls on both reels 3 and 4. In the illustrated embodiment, each of the windows 40, 40' is provided by forming a notch in an upper case 41 and a lower case 42 of the cassette 1 at the juncture between both cases 41, 42 such that the window opens both in the axial end wall of the reel housing portion and the side peripheral side wall of the same, thereby enabling the user to visually confirm the diameter of the roll of the inked sheet on each reel. Since the windows are formed on both sides of the cassette 1, there is no risk for the cassette to be contaminated by dusts and other foreign matters even when it is placed upside down, thus preventing any degradation of the printing quality attributable to such contamination. One of the windows 40, 41' may be hidden by the driving means which transmits driving torque. However, a clear sight is ensured for the other window so that the user can visually check the state of consumption of the inked sheet 2. Thus, the window adjacent to the driving means for transmitting torque may be omitted.

Figure 9:
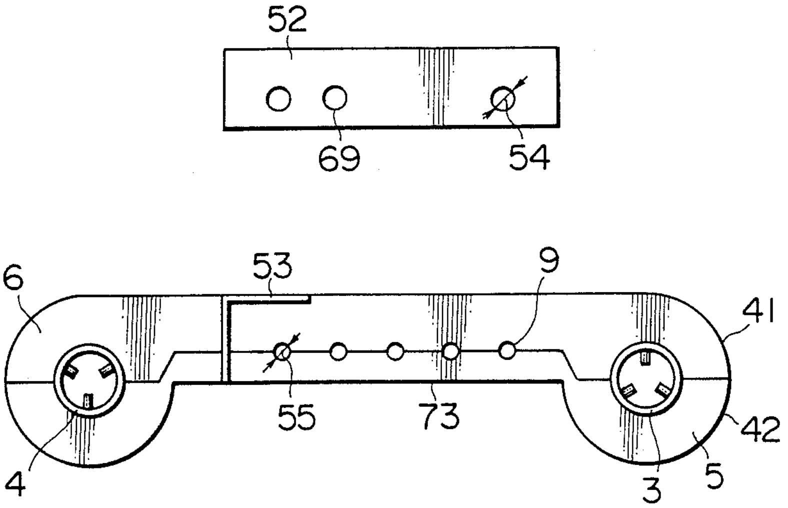
FIG. 9 is a side elevational view of an inked sheet cassette of the invention having holes formed in the top wall thereof and indicative of the type or characteristics of the inked sheet loaded in the cassette.

FIG. 9 shows another embodiment which has means for indicating the characteristics of the inked sheet 2 in the cassette 1. In this embodiment, the indicating means includes 5 indicator holes 9 provided at the juncture between the upper case 41 and the lower case 42 of the cassette at the portion of the cassette 1 constituting one of the bridge portions 73 interconnecting both housing portions. Each indicator hole bears a one-bit information so that the indicating means in this embodiment provides a 5-bit information. A seal member 52 is adhered to the surface of the bridge portion 73 so as to conceal the indicator holes 9. The seal member 52, however, is provided with characteristic designation holes 69 which allows selected indicator holes 9 to be exposed therethrough. The diameter 54 of the characteristics designation hole 69 is greater than the diameter 55 of the characteristics indicator hole 9, so that any possibility of erroneous reading of the characteristic indicator holes 9 by the printer 19, attributable to an offset of the seal member 52, can be avoided. In order to precisely locate the seal member 52 on the cassette 1, the cassette 1 may be provided with a locating member 53 which is adapted to abut a corner of the seal member 52 so as to correctly locate the seal member 52. It is true that this embodiment requires an additional step of the production process because it is necessary to adhere the seal member 52. The seal, however, can serve also as a label which indicates the type of the inked sheet 2. In addition, cassettes of the same design can be used for different types of inked sheets 2, by adhering different types of seal members 52 thereon. This advantageously eliminates the necessity for the preparation of a plurality of different molds which hitherto have been necessary for the production of different types of cassettes. In other words, inked sheet cassettes 1 for different types of inked sheets 2 can be prepared by a single type of mold.

Figure 10A:
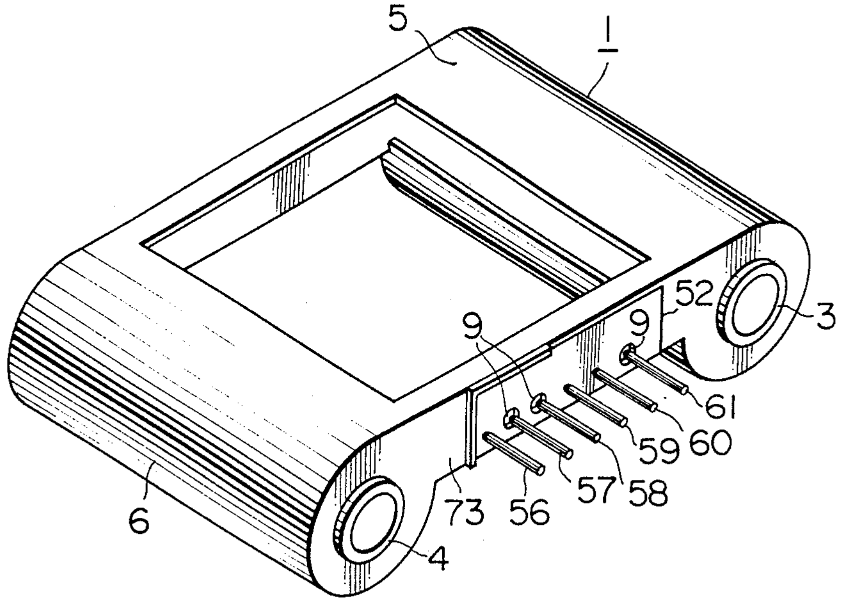
FIGS. 10A, 10B, 11A and 11B are illustrations of the construction of reading means for reading the ink characteristics indicator holes in the cassette walls.

The manner in which the characteristics indicated by the indicator holes 9 in the cassette 1 are read will be described hereinunder with reference to FIGS. 10A and 10B. The seal member 52 adhered to the surface of the cassette 1 is made of a conductive material such as aluminum foil. When the cassette 1 is mounted in the printer 1, six electrodes 56 to 61 are pressed onto this seal member.

Figure 10B:
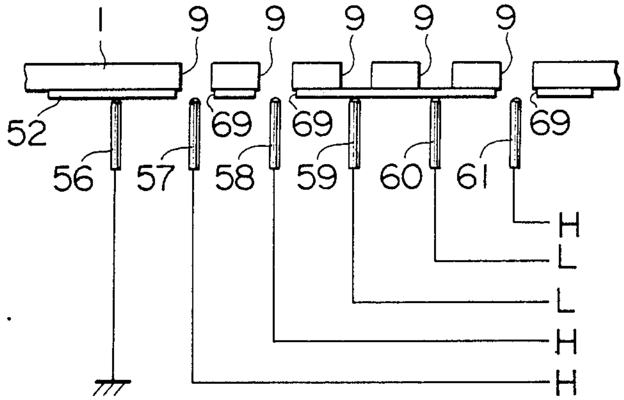

Referring now to FIG. 10B, the electrode 56 is grounded through the body of the printer 19, so that the seal member 52 on the cassette 1 also is held at the ground potential. On the other hand, electrodes 57, 58 and 61 are not grounded because they face the characteristics indicator holes 9, so that these electrodes 57, 58 and 61 are held at a high potential H. In contrast, the electrodes 59 and 60 contact the seal 52 so that they are held at the low potential level L. It is thus possible to form and read a 5-bit information representing the characteristics of the ink sheet 2, by means of the five indicator holes 9 and five electrodes 57 to 61. Although the characteristics indicating means in this embodiment is constituted by five indicator holes 9 formed in the cassette 1 and selectively covered by the seal member 52, the provision of the characteristics indicator holes 9 is not essential. In other words, the means for indicating the characteristics of the inked sheet 2 may be constituted by the seal member alone adhered to the cassette 1.

Figure 11A:
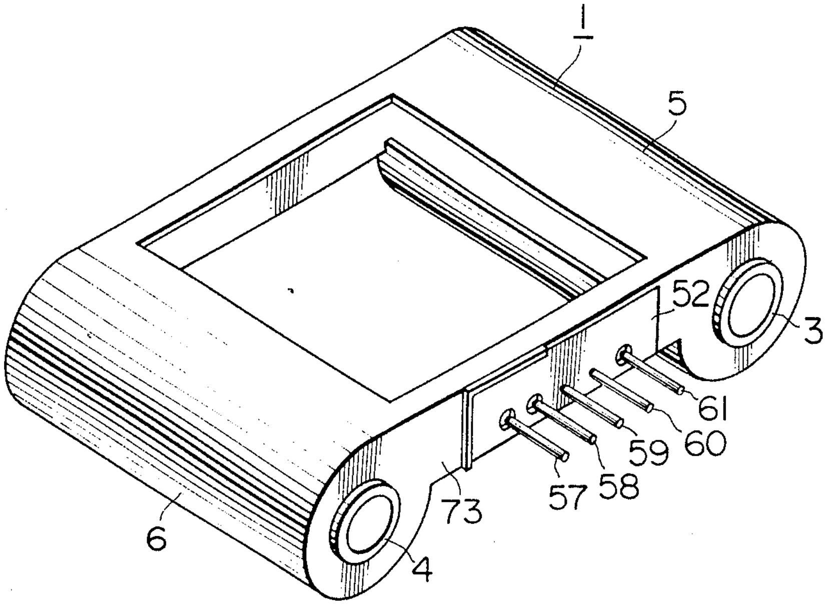
Figure 11B:
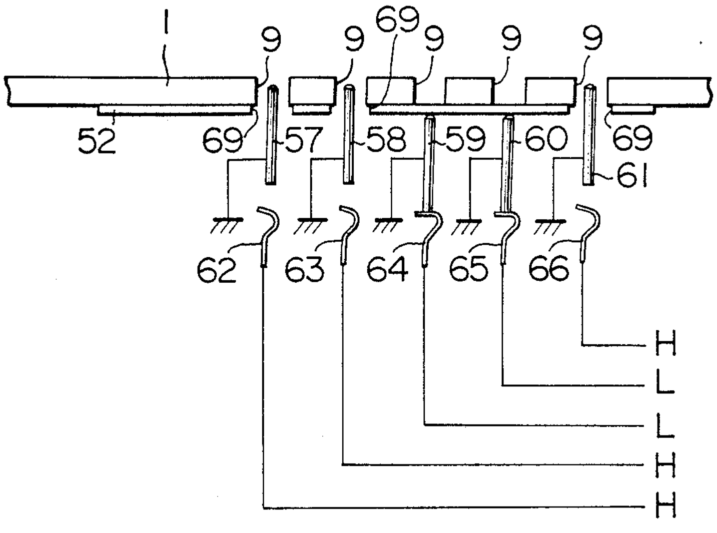

FIGS. 11A and 11B illustrate another embodiment of the arrangement for reading the characteristics indicated by the indicator holes 9 in the cassette 1. As shown in FIG. 11A, when the cassette 1 is mounted in the printer 19, the electrodes 57 to 61 are pressed against the cassette 1. The reading of the characteristics is conducted in a manner which will be explained hereinunder with reference to FIG. 11B. The electrodes are pressed by respective resilient pressing members such as springs (not shown) so as to be pressed onto the seal member 52 so that the electrodes facing the perforated portions of the seal member 52 are urged into the holes. All the electrode are grounded so that SW plates 62 to 66 which are in contact with the respective electrodes are held at the ground potential. However, the electrodes 57, 58 and 61 facing the holes formed in the seal 52 and, hence, urged into the characteristics indicator holes 9 are not contacted by the corresponding SW plates 62, 63 and 66. Thus, these SW plates 62, 63 and 66 are held at the high potential H. On the other hand, the electrodes 59 and 60 are pressed by the seal member 52 so that they are contacted by the respective SW plates 64, 65. The SW plates 64, 65 therefore are held at the ground potential L. Thus, a 5-bit signal borne by the five electrodes 57 to 61 is read as the information concerning the characteristics of the cassette sheet 2 in the cassette 1. In this case, the seal member 52 is not used as a conductor, so that it may be constituted by a non-conductive material, unlike the seal member 52 used in the embodiment shown in FIGS. 10A and 10B. In the embodiment shown in FIGS. 11A and 11B, therefore, there is no risk for the seal member 52 to be corroded by a corrosive substance such as a fat which may be brought into contact with the seal member 52. The use of the seal member 52 which selectively exposes the characteristics indicator holes 9 is not essential. Namely, the characteristics may be indicated by selective formation of the characteristics indicator holes 9 by different molds.

Figure 12:
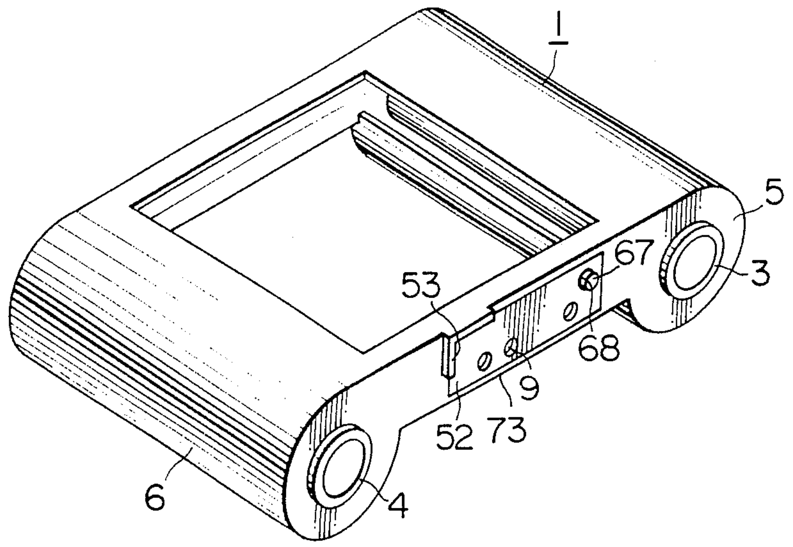
FIGS. 12 to 14 are perspective views for explaining the methods for constructing the characteristics indicator holes in the cassette walls.

FIG. 12 illustrates an example of the measure for preventing any erroneous adhesion of the seal member 52 on the cassette 1. The adhesion of the seal member 52 onto the cassette 1 strictly requires that the characteristics designating holes 69 in the seal member 52 are correctly aligned with the designated characteristics indicator holes 9 in the cassette 1. Manual adhering operation, however, involves a risk for the seal member 52 to be offset from the expected position. The provision of the locating member 53 also is effective in this case. However, such a locating member 53 alone cannot completely eliminate the risk of misalignment because the seal 52 may be placed wrongly upside down. To obviate this problem, the embodiment shown in FIG. 12 employs a combination of a locating hole 68 formed in the seal member 52 and a locating pin 67 provided on the cassette 1. The position of the locating hole 68 is selected to be asymmetrical both in the longitudinal and breadthwise directions of the seal member 52, so that the seal member 52 cannot be adhered unless it is located correctly. This arrangement therefore eliminates any risk of erroneous reading of the information which may otherwise be caused due to incorrect positioning of the seal member 52. In addition, the adhesion of the seal member 52 is facilitated so that the efficiency of the work can be improved appreciably.

Figure 13:
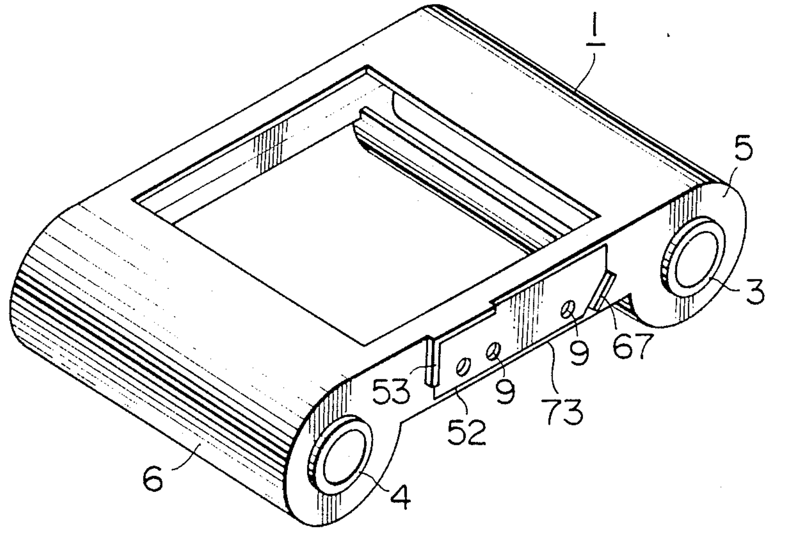

FIG. 13 illustrates another arrangement for ensuring correct positioning of the seal member 52. The arrangement is basically the same as that shown in FIG. 12 so that it will suffice to state that a corner of the seal member 52 is obliquely cut to provide a sign for indicating the correct orientation of the seal member 52. At the same time, a seal member locating member 67 is provided on the cassette 1 in conformity with the obliquely cut corner of the seal member 52. It will be seen that, if the seal member 52 is placed upside down, another corner of the seal member 52 is positioned on the locating member 67 so as to prevent the seal member 52 to be adhered to the cassette 1, thereby ensuring that the seal member 52 is adhered incorrect position and orientation.

Figure 14:
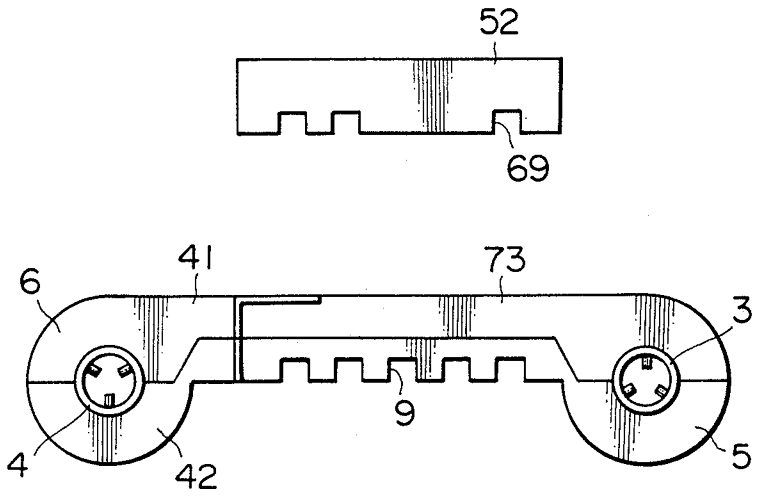

FIG. 14 shows another embodiment which also has characteristics indicator holes 9. In this embodiment, the characteristics indicating holes 9 are provided in the form of notches formed in the underside of the lower case 42 of the cassette 1, unlike the preceding embodiments in which the characteristics indicator holes are provided in the juncture between the upper and lower cases of the cassette 1. Accordingly, the characteristics designating holes 69 in the seal member 52 also are formed as notches in the lower edge of the seal member 52. This embodiment is advantageous in that any existing mold part which has been used for forming the upper case 41 can be used without any modification. The selection of the characteristics indicator holes 9 by the combination between these holes and the characteristics designating holes 69 may be achieved by employing a plurality of different molds for forming cassettes 1 having different arrangements of the characteristics indicator holes. The characteristics indicator holes 9 also maybe located either in the upper side of the cassette upper case 41 and the joint surfaces of the upper and lower cases 41, 42 where these cases are jointed to each other.

Figure 15:
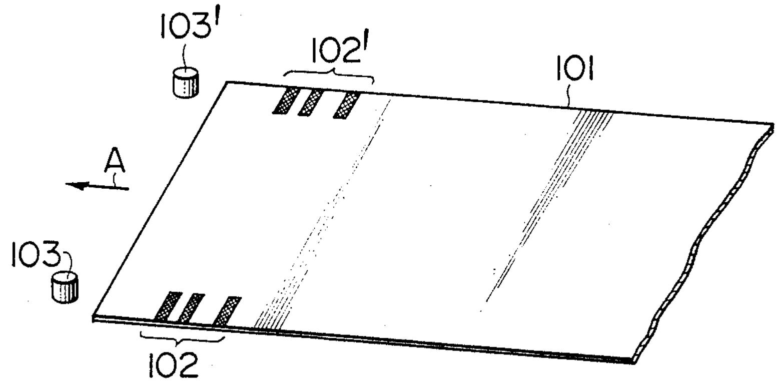
FIG. 15 is a perspective view illustrating a mark provided on the reverse side of a print paper and means for reading the mark.

FIG. 15 illustrates an example of the print paper 101 having a mark indicative of the type of the print paper 101.

More specifically, the print paper 101 shown in FIG. 15 is provided on the reverse side thereof with a coded pattern 102, 102' such as bar codes indicative of the type of the print paper 101. When the print paper 101 is fed in the direction of the arrow A, the code patterns 102, 102' are read by the photo-sensors 203, 203' the outputs of which are delivered to a suitable data judging means (not shown) in the printer such as a system control computer, whereby the type of the print paper 101 is read and recognized. On the basis of these data, the printer alters the mode of the printing operation. When the print paper 101 has been judged as being unusable in the printer, the paper feed operation is suspended or, alternatively, the printer sends the paper directly to the paper eject 117 without conducting printing. Although the arrangement shown in FIG. 15 employs a pair of photo-sensors 103, this is not exclusive and the printer may employ only one photo-sensor capable of sensing the coded patterns provided along one edge of the print paper 101. In this case, the print paper 101 may be provided with the coded patterns along both edges thereof so that either one of these coded patterns is read by the single photo-sensor 103.

Although the print paper 101 shown in FIG. 15 is provided with the coded patterns 102, 102' on the portion thereof near the leading end as viewed in the direction of feed of the print paper 101, the print paper 101 may also be provided with similar coded patterns on the trailing end portion thereof so that data is available in symmetry with respect to the direction of length of the print paper 101 so as to enable the print paper 101 to be inserted from either longitudinal end thereof. It is also possible to arrange such that the coded pattern 102 formed along one longitudinal edge of the print paper 101 carries information different from that carried by the coded pattern 102' formed along the other longitudinal edge of the print paper 101. In such a case, the print paper can have a greater deal of data, i.e., more detailed information.

Figure 16A:
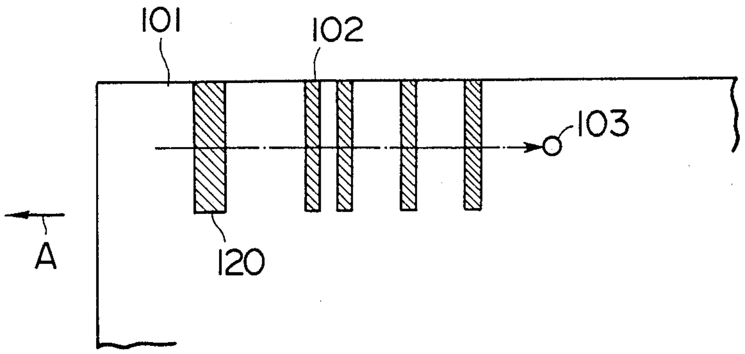
FIGS. 16A, 16B, 17A, 17B, 18A, 18B, 19A and 19B are illustrations of examples of the mark provided on the reverse side of the print paper and examples of outputs from reading means suitable for use in combination with such examples of the mark.

FIG. 16A shows an example of the coded pattern 102 formed on the print paper 101 and indicative of the type of the print paper 101. The print paper 101 has, on the leading side of the coded pattern 102 as viewed in the direction of feed represented by an arrow A, a mark 120 which indicates whether the obverse or the reverse side of the print paper 101 is directed upward. The coded pattern 102 indicative of the type of the print paper 101 consists of consecutive white and black bars as illustrated. The photo-sensor 103 on the printer 19 scans the coded pattern 102 in a scanning period which is determined by the speed of movement of the print paper 101.

Figure 16B:
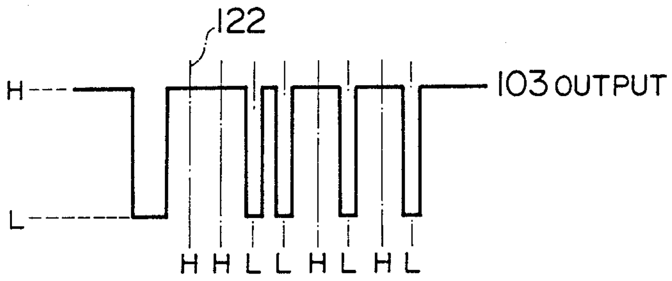

FIG. 16B shows the waveform of the output produced by the photo-sensor 103 upon scanning the coded pattern 102. When the print paper 101 is fed at a predetermined speed through the thermal transfer-type printer 105, a sampling is effected at a plurality of sampling points 122 set at a constant pitch or time interval, whereby the coded pattern 102 is decoded.

Figure 17A:
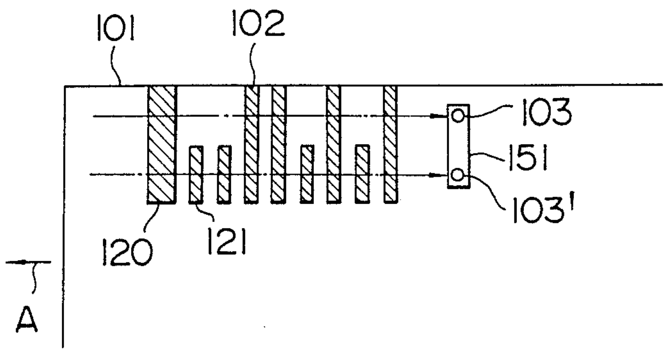
Figure 17B:
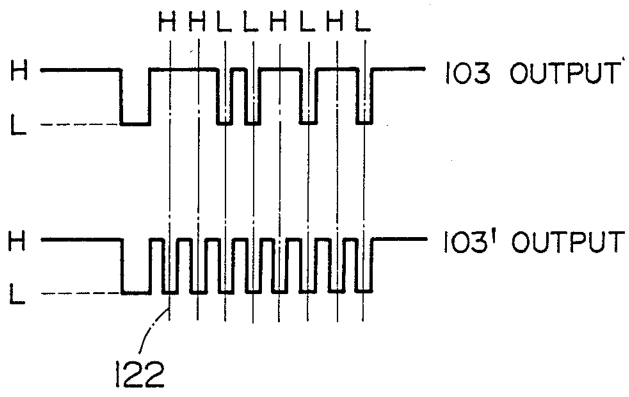

FIG. 17A shows another example of the coded pattern provided on the print paper 101 and indicating the type of the print paper 101. More specifically, the print paper 101 is provided, on the leading end thereof as viewed in the direction of feed indicated by an arrow A, a discrimination mark 120 for discriminating whether the obverse or the reverse side of the print paper 101 is directed upward. On the trailing side of the discrimination mark 120 is disposed a clock pattern 121 consisting of alternating black and white portions and the coded pattern 102 indicative of the type of the print paper, the coded pattern 102 being provided in synchronism with the clock pattern 121. The photo-sensor 103 provided on the thermal transfer-type printer 105 is composed of a sensor unit 103 for reading the coded pattern 102 and a sensor unit 103' for reading the clock pattern 103'. Both sensor units 103, 103' are arranged in the same sensor holder so that the coded pattern 102 and the clock pattern 121 are read simultaneously. More specifically, the sensor units 103 and 103' are located at the same position in the direction of feed (see arrow A) of the print paper 101 but are spaced from each other in the direction perpendicular to the direction of feed. Thus, the sensor unit 103 is sensitive only to the coded pattern 102 while the sensor unit 103' senses only the clock pattern 121. FIG. 17B shows the outputs from the photo-sensor units 103. 103'. It will be seen that the respective outputs precisely correspond to the patterns shown in FIG. 17A and the bars of the coded pattern 102 are read in perfect synchronization with some of the bars of the clock pattern 121. The information carried by the coded pattern 102 is read as the coded pattern 102 is decoded through reading the output of the sensor unit 103 at sample points 122 which coincide with the output pulses from the sensor unit 103' capable of sensing the clock pattern 121. It will be seen that this embodiment enables the coded pattern to be decoded and read accurately, even when the speed of feed of the point paper 101 fluctuates to make it impossible to read the pattern at a regular time interval.

Figure 18A:
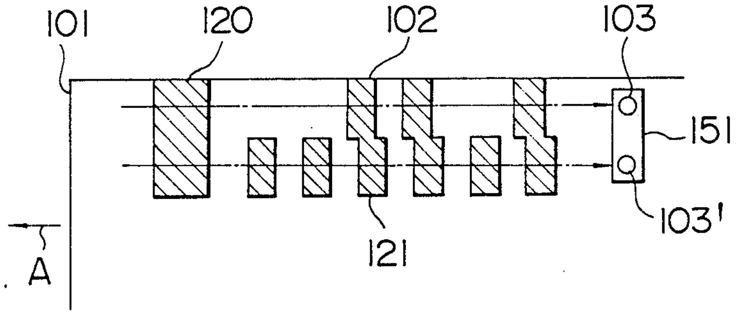

FIG. 18A illustrates still another example of the coded pattern provided on the print paper 101 and indicative of the type of the print paper 101.

This example is similar to that shown in FIG. 17A in that the coded pattern 102 and the clock pattern 121 are formed in a side-by-side fashion on the reverse side of the copy paper 101. In this example, the clock pattern 121 is provided with a certain delay of phase from the coded pattern 102. The arrangement for scanning these patterns 102, 121 by sensor units 103, 103' is not described because it is materially the same as that explained before in connection with FIG. 17A.

Figure 18B:
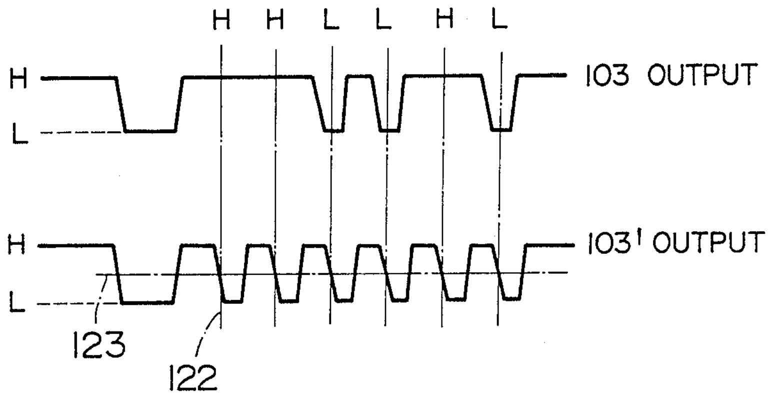

FIG. 18B shows the waveforms of the output from the sensor unit 103 which senses the coded pattern 102 and the output from the sensor unit 103' which senses the clock pattern 121. When each of the sensor units 103, 103' has sensed a change from black to white, the output from the sensor does not rise drastically but rises at a certain gradient requiring a certain length of time. The sampling point 122 is determined on the basis of the waveform of the clock pattern, more specifically by a threshold level 123 at which the level of the sensor output is judged. However, since the change in the waveform occurs rather gently, it is rimpossible to definitely locate the position or moment at which the threshold level 123 is crossed by the output waveform, thus making it impossible to determine the sampling point 122. This causes a risk that the sampling of the coded pattern 102 cannot be conducted at the correct timing. In the preceding example shown in FIG. 17, the sampling points are set at moments which is delayed by a certain time after the start of fall of the clock pattern 121. Such an arrangement, however, essentially requires a delay circuit for delaying the timings of the sampling points. In contrast, in the example shown in FIG. 18A, the phase of the clock pattern 21 is delayed behind the phase of the coded pattern 102 so that, when a sampling point 122 is set at the moment at which the output of the sensor unit 103; has crossed the threshold level 123, the output of the photo-sensor 103, i.e., the level of the signal corresponding to the coded pattern 102, has been already settled. Thus, the example shown in FIG. 18A eliminates the necessity for the provision of the delay circuit, so that the production cost is reduced appreciably.

Figure 19A:
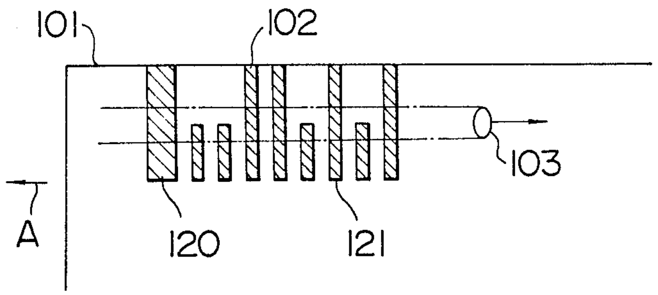

FIG. 19A shows a further example of the arrangement for reading the mark provided on the print paper 101 and representing the type of the print paper 101. In this case, the arrangement of the mark 120, coded pattern 102 and the clock pattern 121 on the reverse side of the print paper 101 is identical to that shown in FIG. 17A so that detailed description thereof is omitted. The example shown in FIG. 19A features the use of only one photo-sensor 103 for sensing both the coded pattern 102 and the clock pattern 121. More specifically, the single photo-sensor 103 has a light input opening of a width large enough to cover the region where both the clock pattern 121 and the coded pattern 102 appear so that the single sensor 103 can sense both the coded pattern 102 and the clock pattern 121 simultaneously.

Figure 19B:
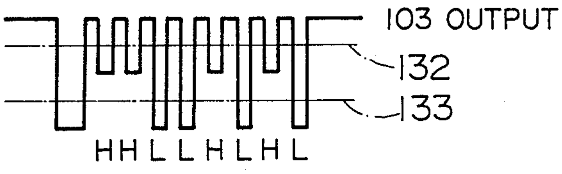

FIG. 19B shows the waveform of the output from the single photo-sensor 103. It will be seen that the output has three levels: namely, a first level corresponding to the portion which is devoid of both the clock pattern and the coded pattern, a second level corresponding to the portion where only the clock pattern exists and a third level corresponding to the portion where both the clock pattern and the coded pattern exist. This output is subjected to an A/D operation effected on the basis of two threshold levels: namely, a clock reading threshold 132 and the code reading threshold 133, whereby a discrimination is conducted between the portion where only the clock pattern 121 exists and the portion where both the clock pattern 121 and the coded pattern 102 exist. Thus, in this example, it is possible to detect the type of the print paper 101 with a single photo-sensor 103, whereby the production cost is reduced appreciably.

Figure 20A:
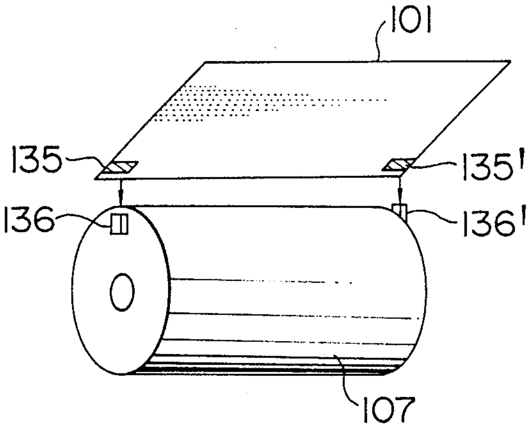
Figure 20B:
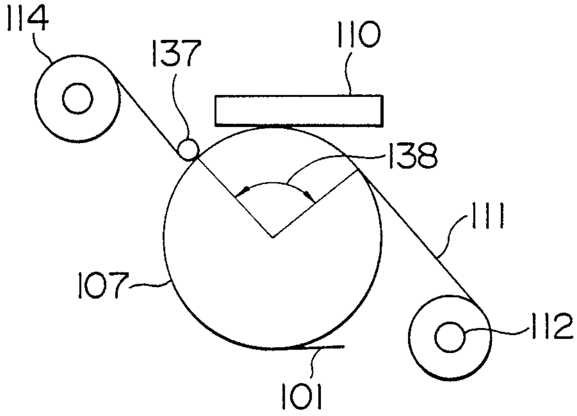

FIGS. 20A and 20B show an example of an arrangement for locating the print paper 101 by means of indexing marks 135, 135; provided on the reverse side of the print paper 101.

FIG. 20A shows the positional relationship between the print paper 101, the drum 107 and indexing sensors 136, 136′ for locating and indexing the print paper 101. The print paper 101 is provided on both side edges of the reverse side thereof with indexing marks 135, 135′ for locating and indexing the print paper 101. The print paper has a width which is slightly greater than the axial length of the drum 107 so that the indexing marks 135, 135; are visible from the lower side of the drum 107 when the print paper 101 is wound on the drum 107. The indexing sensors 136, 136′ are provided adjacent to both axial ends of the drum 107 so as to be able to sense the indexing marks 135, 135′ thereby detecting the position of the print paper 101.

FIG. 20B diagrammatically shows an essential portion of the thermal transfer-type printer 105, illustrating particularly an example of the position where the indexing sensors 136 are provided. The print paper 120 runs in contact with the surface of the rotating drum 107. It is, however, experienced that the print paper 101 undesirably floats above the surface of the drum in a certain region along the circumference of the drum 107. The indexing sensors 136, 136′, therefore, are provided o the region where the inked sheet 111 is pressed onto the drum 107, i.e., in the region where the print paper 101 is stably clamped between the surface of the drum 107 and the inked sheet 111. This region is represented as the indexing region 138 in FIG. 20B.

Since the indexing sensors 136, 136′ are provided in the indexing region where the print paper 101 is stably held in contact with the drum surface without floating, it is possible to prevent any inferior indexing attributable to the fluctuation of the position of the print paper 101 due to floating, thus ensuring correct indexing of the print paper 101 and, hence, a correct superposition of the images of different colors. Although in this example the indexing of the copy paper 101 is effected on the basis of the indexing marks provided on the reverse side of the print paper 101, this is only illustrative and the detection of the position of the print paper and the indexing of the same may be effected through detection of the leading end of the print paper 101.

Figure 21:
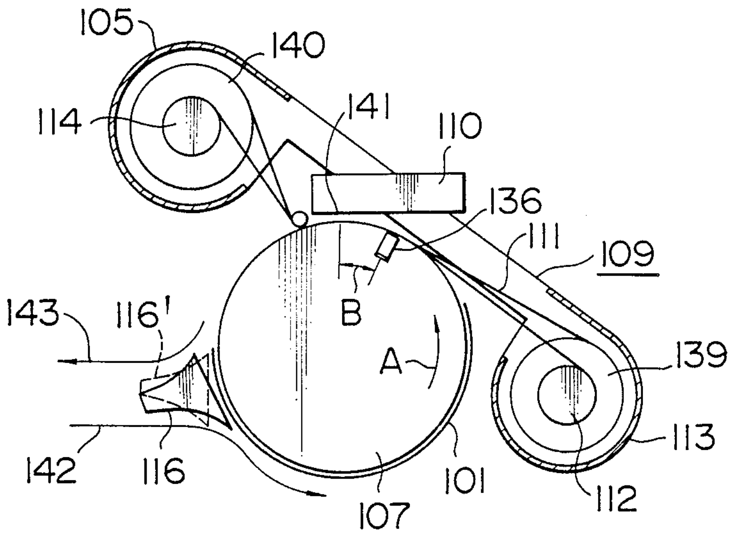
FIGS. 20A, 20B and 21 are illustrations of arrangements for locating the print paper in a printer.

FIG. 21 shows an essential portion of a printing mechanism in a thermal transfer-type printer embodying the present invention. The principle of the printing operation has been already described in connection with FIG. 2 and, therefore, detailed description is omitted in this regard. Referring to FIG. 21, indexing sensors 136 are provided adjacent to both axial ends of the drum 107. When the print paper 101 is fed in the direction of an arrow A in accordance with the rotation of the drum 107, the position of the print paper 101 is detected by the indexing sensor 136. The printing operation is commenced after elapse of a predetermined delay time B from the moment at which the print paper 101 is detected by the indexing sensors 136. The position of the print on the print paper 101 can freely be selected by an adjustment of the delay time B.

Figure 22A:
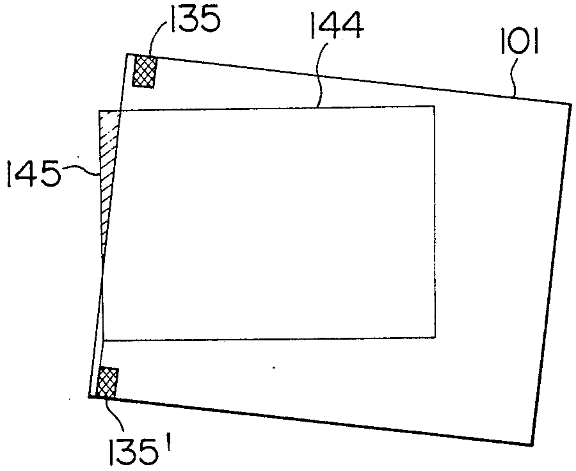
FIGS. 22A, 22B, 23A and 23B are illustrations of the manner in which the print paper is actually located.
Figure 22B:
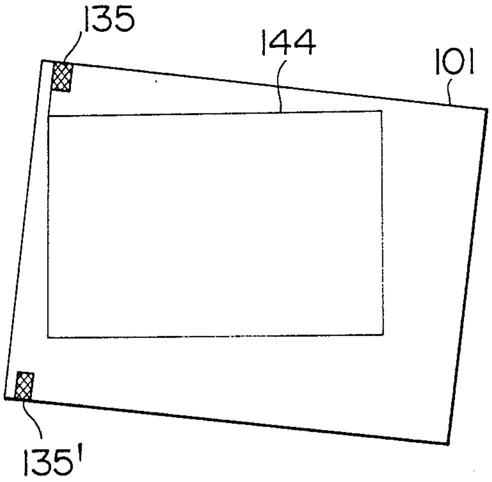

FIGS. 22A and 22B illustrate an operation for indexing the print paper 101 by the indexing sensors, performed when the print paper 101 is fed slantwise with respect to the predetermined direction of feed.

When the print paper 101 has been fed slantwise, the printing region 144 on the print paper 101 cannot be determined stably. In the worst case, the print region may fail to be within the area of the print paper 101, with the result that a certain portion 145 of the print region comes out of the area of the print paper 101.

It is assumed here that the printing has to be commenced at a line which is in the very close proximity of the leading end of the print paper 101, i.e., without any margin on on the leading side of the print paper 101. To meet such a demand, the indexing marks 135, 135′ also have to be positioned very close to the leading end of the print paper 101. It will be seen that, if the print paper 101 is fed in the right posture, both indexing sensors 136, 136' can detect corresponding indexing marks 135, 135' simultaneously. However, if the print paper 101 is fed slantwise, a certain time offset is caused between the moment of detection of the indexing mark 135 by the indexing sensor 136 and the moment of detection of the indexing mark 135' by the indexing sensor 136'. It is thus possible to detect any slant of the print paper 101 by detecting such a time offset. If the print is commenced immediately after the detection of the leading indexing mark 135', the portion 145 of the print region 144 undesirably comes out of the print paper 101, as shown in FIG. 22A. When it is desired to commence the printing with minimal margin on the leading end of the print paper 101, therefore, the printing operation is started immediately after the detection of the trailing indexing mark 135 so that the print region 144 can be completely covered by the area of the print paper 101, as will be seen from FIG. 22B. Although the described operation relies upon the detection of the indexing marks provided on the reverse side of the print paper 101, this is not exclusive and the same effect can be produced by the use of sensors capable of detecting the leading edge of the print paper 101.

Figure 23A:
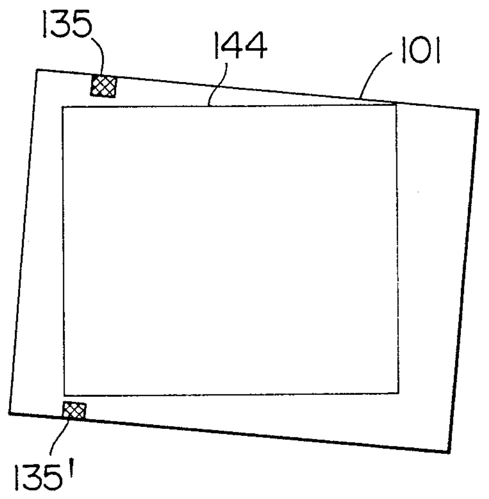
Figure 23B:
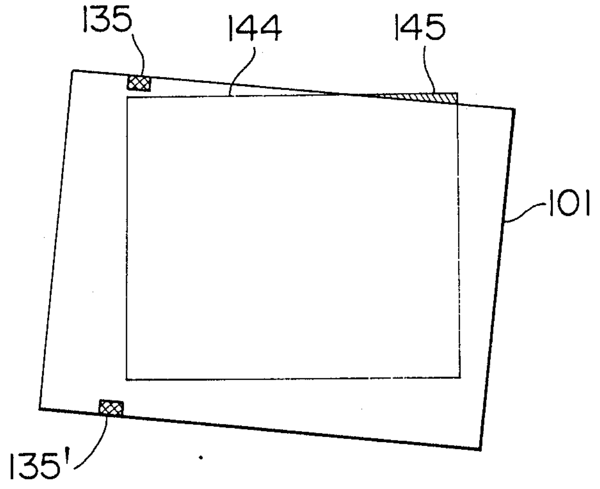

FIGS. 23A and 23B show another example of the indexing method which is carried out when the print paper 101 is fed slantwise. In contrast to the case of the method explained with reference to FIGS. 22A and 22B, the method which will be described hereinunder with reference to FIGS. 23A and 23B are used when the printing has to be conducted with minimal margin on one side edge of the print paper 101. In this case, if the printing is commenced in synchronization with the detection of the trailing indexing mark 135 as is the case of the example explained in connection with FIGS. 22A and 22B, a portion 145 of the print region comes outside the area of the print paper 101, as shown in FIG. 23B, as will be seen from FIG. 23B. In order to obviate this problem, therefore, the printing is commenced in synchronization with the detection of the leading indexing mark 135 so that the whole of the print region 144 falls within the area of the print paper 101.

Thus, according to the invention, the timing of the start of the printing operation is suitably controlled in relation to the detection of the indexing marks 135, 135 in accordance with the desired position of the print region with respect to the print paper 101, so that the whole of the print region is completely covered by the area of the print paper 101, thus ensuring a high quality of the print even when the print paper 101 is fed slantwise. Although the described operation relies upon the detection of the indexing marks provided on the reverse side of the print paper 101, this is not exclusive and the same effect can be produced by the use of sensors capable of detecting the leading edge of the print paper 101.

Figure 24:
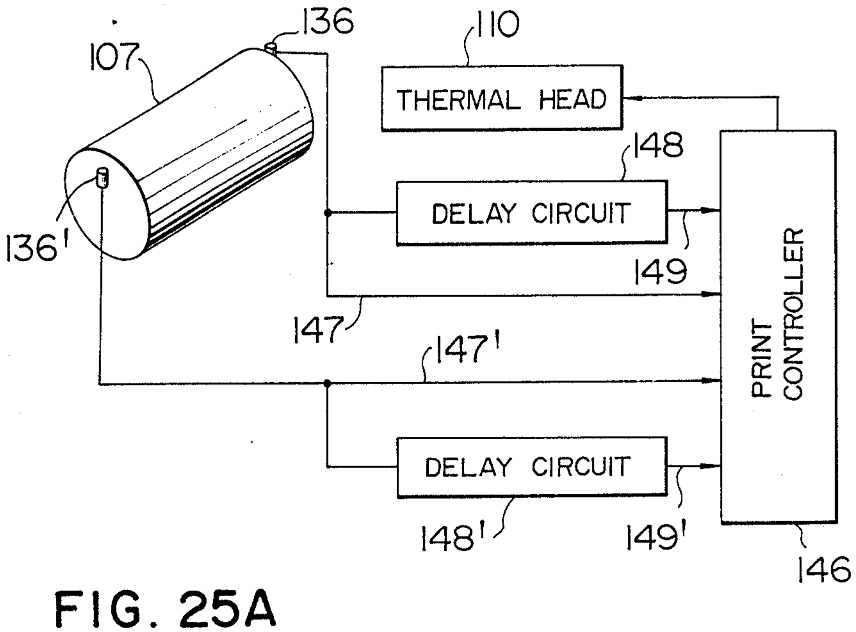
FIG. 24 is an operational block diagram of a device for locating the print paper.

FIG. 24 is a block diagram of an example of a control circuit which controls the position of start of the printing in response to the output signals from the pair of sensors 136, 136' used in the method explained before in connection with FIGS. 22A, 22B and 23A, 23B.

Indexing sensor signals 147, 147' derived from the indexing sensors 136, 136' are input to the print controller 146. The print controller 146 judges, in accordance with the shape of the print region, whether the sensor signal produced upon detection of the leading indexing mark or the sensor signal produced upon detection of the trailing sensor is to be used. Thereafter, the position of start of the printing on the print paper 101 is controlled by making use of a delay circuit 148 or 148' which produces a time delay B explained before. Namely, the sensor signals 147, 147' from the indexing sensors 136, 136' are delivered to the print controller 146 through the respective delay circuits 148, 148' with the delay B of time, so that the print controller 146 produces a print start instruction signal upon receipt of such a delayed signal, thereby to enable the thermal head 110 to start the printing. In the case of the methods explained before in connection with FIGS. 22A, 22B and 23A, 23B, the print is commenced without substantial delay after the receipt of the sensor signal, so that the delay circuits 148, 148' are not used. The provision of the delay circuits 148, 148', however, is effective in the case where the circumstances does not allow, due to, for example, a restriction in the mechanism design, the indexing sensors 136, 136' to be set on the position where the printing is to be commenced, i.e., when the indexing marks 135, 135' are detected before the print start position on the print paper 101 is brought to the printing position. The use of the delay circuits also is necessary when the control is conducted upon detection of the leading end of the print paper 101. In the control circuit shown in FIG. 24, the delay circuits 148, 148' are arranged as independent blocks. This, however, is not essential and the delay circuits may be constructed as a software if the print controller 146 is constituted by, for example, a microcomputer.

Figure 25A:
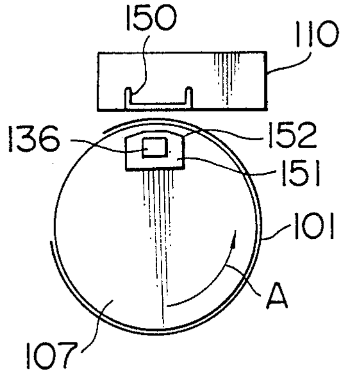
FIGS. 25A and 25B are a side elevational view and a front elevational view of detecting means for detecting the position of the print paper.
Figure 25B:
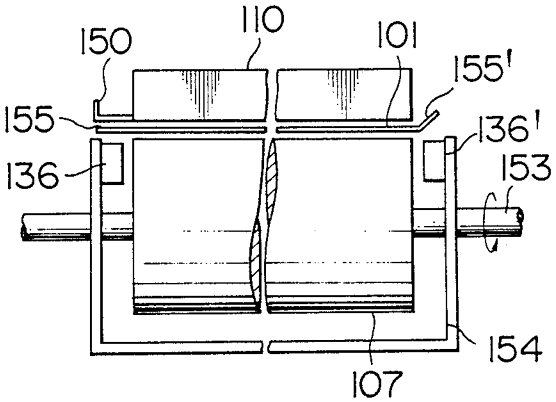

FIGS. 25A and 25B illustrate an example of the arrangement of mechanical parts around the indexing sensors 136, 136'.

Referring to FIG. 25A, a reflective plate 150 is disposed on the opposite side of the print paper 101 to the indexing sensors 136, 136'. Each of the indexing sensors is designed to detect a change of the color from white to black of the indexing mark provided on the reverse side of the print paper 101. When the print paper 101 is absent, therefore, the indexing sensor cannot produce any definite output, often resulting in an erroneous operation of the printer. In the arrangement shown in FIG. 25A, however, this problem is overcome because the reflective plate 150 opposing to the indexing sensors 136, 136' enables the indexing sensors 136, 136' to always output a signal of a level corresponding to the white portion of the reverse side of the print paper 101 unless these sensors face the indexing marks 135, 135', regardless of whether the print paper 101 is absence or present. The indexing sensors 136, 136' are held by the respective sensor holders 151. The sensor holder 151 is provided with a curved surface of a radius of curvature equal to or smaller than that of the drum, at at least the portion thereof facing the print paper 101, whereby the print paper 101 can be fed smoothly without being interfered. It is also possible to blacken the reverse side of the reflective plate 150 so that the indexing sensors 136, 136' can discriminate between the presence and absence of the print paper 101. Such an arrangement can effectively be used when the control relies upon the detection of the leading end of the print paper 101.

FIG. 25B illustrates the mechanism of FIG. 25A as viewed from the front side thereof. More specifically, the right portion of FIG. 25B shows an arrangement in which the reflective plate 150 shown in FIG. 25A is omitted so that the end portion 155 of the print paper 101 has been undesirably bent and curved upward away from the indexing sensor 136'. In this case, the leading sensor 136' may fail to detect the indexing mark 135' because the end portion 155 is spaced apart from this sensor 136', resulting in an erroneous operation. This problem does not occur when the printer is provided with the reflective plate 150. Namely, when the reflective plate 150 exists, the end portion 155 of the print paper 101 is pressed by the reflective plate 150 so as to correctly face the indexing sensor 136, as will be seen from the left portion of FIG. 25B.

Figure 26:
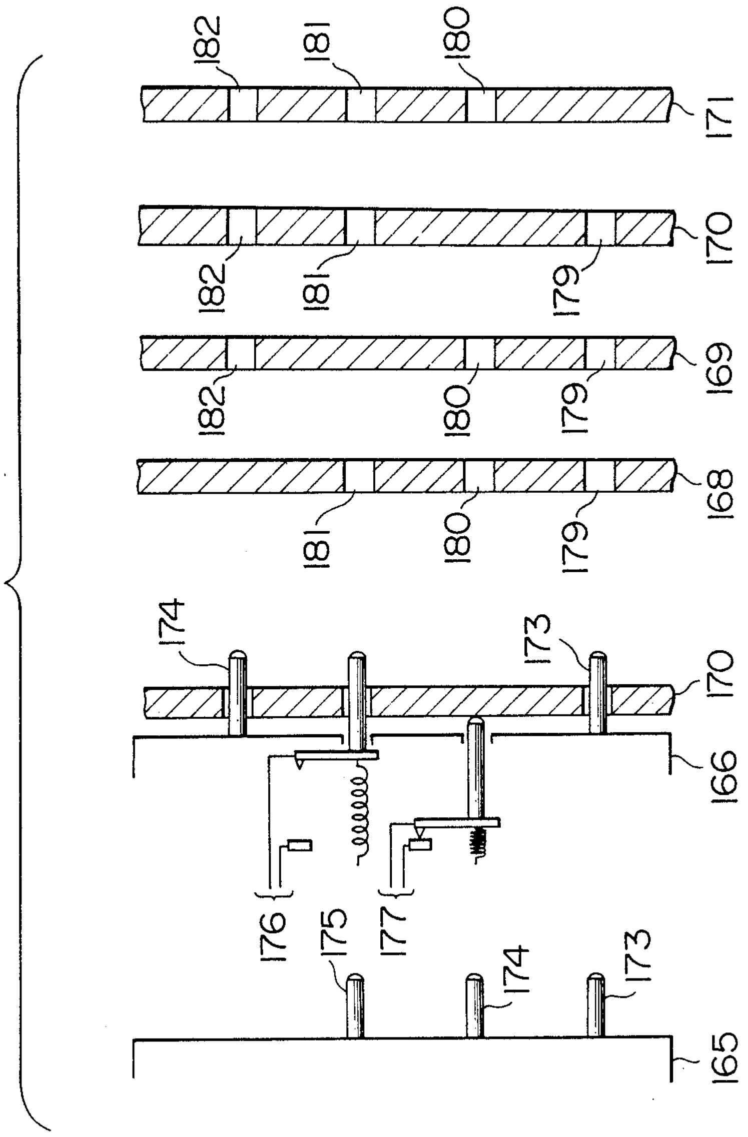
FIGS. 26 to 31 and FIGS. 32A and 32B are illustrations of an arrangement for reading, through the detection of the positional relationship between the ink characteristics indicator holes in the inked sheet cassette and the reading portion of the printer, the characteristics of the inked sheet thereby preventing the loading of the erroneous inked sheet cassette.

FIG. 26 illustrates another example of combination between a printer 165 and different types of cassettes 168 to 170, similar to the combination explained before in connection with FIG. 11.

Different cassettes 168 to 171 accommodate inked sheets 11 of different types. It will be seen that, amongst the four types of cassettes 168 to 171, only the cassette 168 is adaptable to the printer 165. Namely, insert prevention pins 173 to 175 provided on the printer 165 are arranged in conformity with a specific arrangement of holes 179 to 181 realized only on the cassette 168. For instance, the cassette 169 cannot be mounted on the printer 165 because this cassette does not have how which would receive the insertion prevention pin 175 on the printer 165. The same applies also to the cases of other cassettes 170 and 171. It is thus possible to reject any cassette which does not meet the specifications of the printer 165. Another printer denoted by 166 has insertion prevention pins which are arranged to accept only the cassettes 168 and 171, while rejecting the cassettes 168 and 171 due to interference of the pins 173, 174. FIG. 26 shows the cassette 170 mounted on the printer 166. It will be seen that the cassette 170 does not have any hole at the position corresponding to the hole 180 in other cassettes, but is provided with a hole 181 at the position corresponding to the holes 181 in other cassettes 168, 171. On the other hand, the printer 166 is provided with switches 176, 177 for cooperation with the pins arranged at positions corresponding to the holes 180, 181. Therefore, when the cassette 170 is mounted, the switch 176 is turned off while the switch 170 is turned off, whereby the cassette 170 is recognized. The switches 176, 177 also serve as sensor means for sensing presence or absence.

Figure 27:
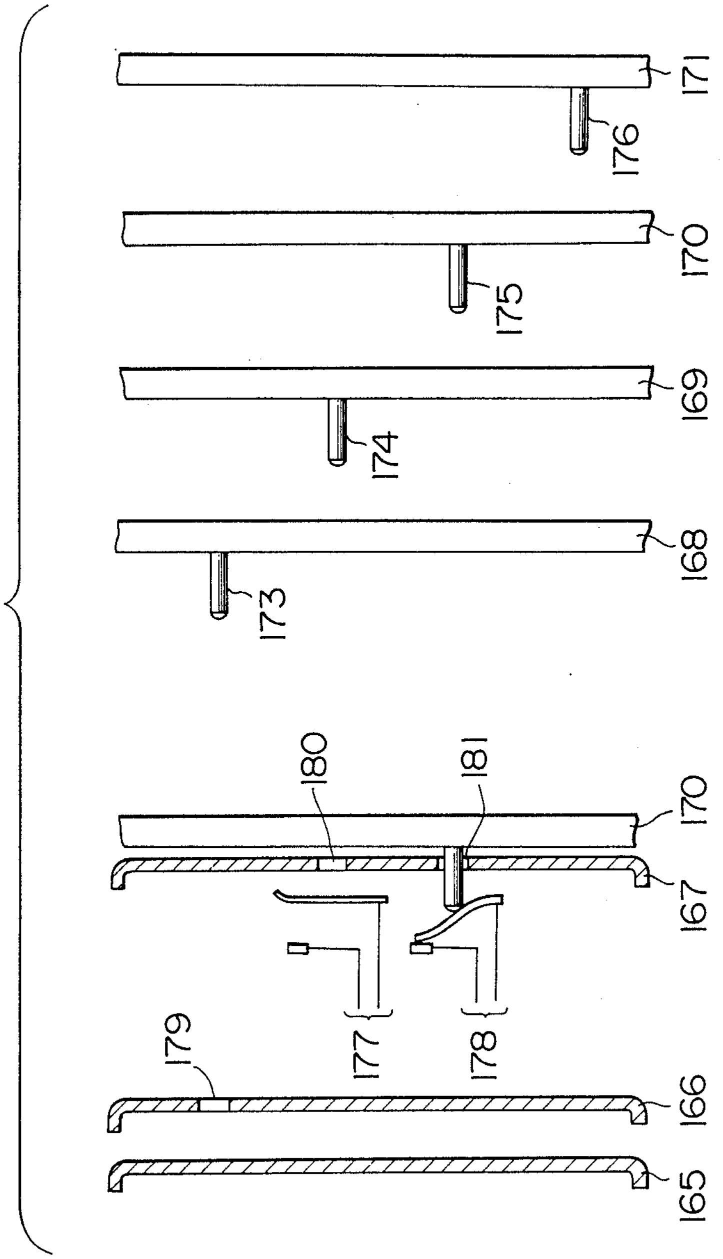

FIG. 27 illustrates another example of the combination between the printer 165 and the cassette 109.

There are four types of cassettes 168 to 171 accommodating different types of inked sheets 111. The printer 166 has a hole 179 which is positioned such that the printer 166 can accept only the cassette 168. Namely, the cassette 168 is provided with an insertion prevention pin 173 which is positioned such that it can be aligned with the hole 179, whereas other cassettes 169 to 171 have insertion prevention pins 174 to 176 which are offset from the position of the hole 179, whereby insertion of wrong cassette can be avoided. Another printer 167 is provided with holes 180, 181 so that it may accept the cassettes 169 and 170. In FIG. 27, the cassette 170 is mounted on the printer 167. It will be seen that a switch 178 has been turned on by the insertion prevention pin 175 on the cassette 170, while another switch 177 is kept in off state, so that the printer 167 can recognize the cassette 170 mounted thereon. The switches 177, 178 also serve as sensor means for sensing presence or absence.

A numeral 165 denotes a conventional printer which has no means for reading the characteristics of the inked sheet. This printer rejects the cassettes 168 to 171 which have insertion prevention pins, and receives only a conventional cassette (not shown) which does not have any insertion prevention pin.

Figure 28:
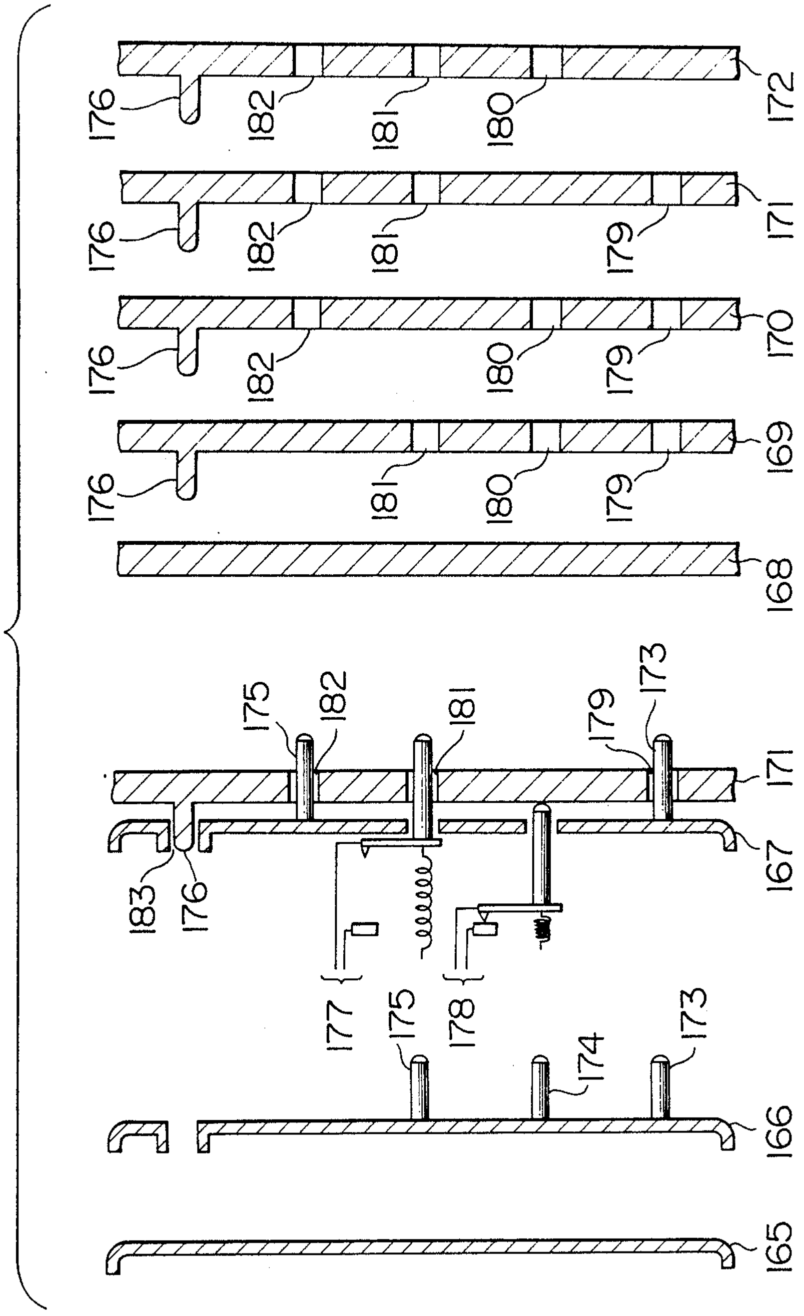

FIG. 28 shows still another example of the combination between the printer 165 and the cassette 109.

There are five types of cassettes 168 to 172 accommodating different types of inked sheets 111. The conventional printer 165 having no means for discriminating the type of the cassette will receive all the cassettes which are shown in FIG. 26, thus failing to prevent insertion of a wrong cassette. The combination shown in FIG. 28 therefore employs five types of cassettes: namely, a cassette 168 which is mountable on the conventional printer 165 and which accommodates a conventional type of inked sheet, and cassettes 169 to 172 which hold new types of inked sheets designed for use in new types of printer. These new types of cassettes 169 to 172 are provided with insertion prevention pins 176 so that they cannot be mounted on the conventional printer. The arrangement shown in FIG. 28 is materially the same as that explained before in connection with FIG. 26 except that the new types of cassettes are provided with insertion prevention pins for preventing these cassettes from being mounted on the conventional printer. Further description concerning the construction and operation of the combination shown in FIG. 28 is therefore omitted. It will also be seen that the conventional cassette 168 cannot be mounted on the new types of printers 166, 167. Although not shown, however, it is possible to construct a printer which can accept conventional type of cassette, as well as new types of cassettes. Such a printer is devoid of insertion prevention pin and the mounting of the conventional type of cassette is recognized through turning on of all switches.

Figure 29:
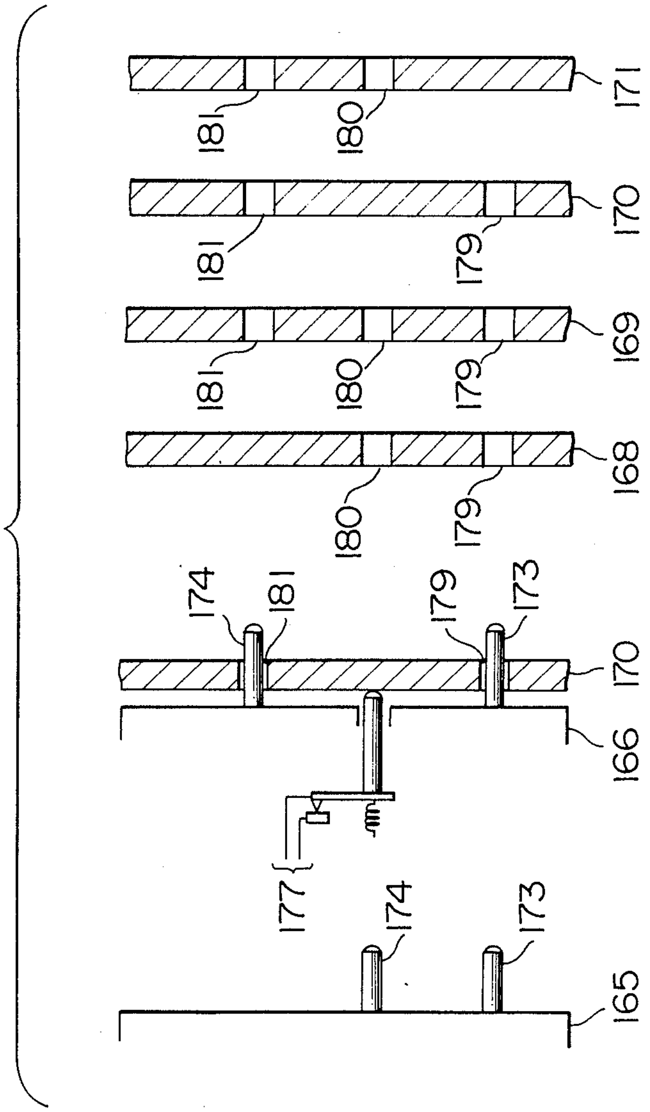

FIG. 29 shows a still further example of the combination between the printer 165 and the cassette 109. There are four types of cassettes 168 to 171 accommodating different types of inked sheets 111. The cassettes have holes arranged at three different positions and four types of the inked sheets are identified depending on the number and positions of these holes. The printer 165 has insertion prevention pins 173, 174 so that it can accept two out of four cassettes, namely, the cassettes 168 and 169. The printer 165, however, has no means for discrimination between the cassettes 168 and 169. Thus, the printer 165 is an inexpensive printer which is devoid of any inked sheet discrimination switch. Any difference in the printing result attributable to the difference in the type of the inked sheet is therefore compensated for through a manual adjustment by the user by means of, for example, an adjusting knob on the printer. Another printer 166, which can accept both the cassettes 169 and 170, is provided with a switch 177 which constitutes a discrimination means for discriminating between the cassette 169 and 170. In the illustrated case, the switch 177 is turned on so that the printer can recognize that the cassette now mounted thereon is the cassette 170. This arrangement is effective in reducing the number of switches on the printer. In addition, it is possible to realize an inexpensive printer which is operable with different types of inked sheets with the aid of a manual adjusting means.

Figure 30:
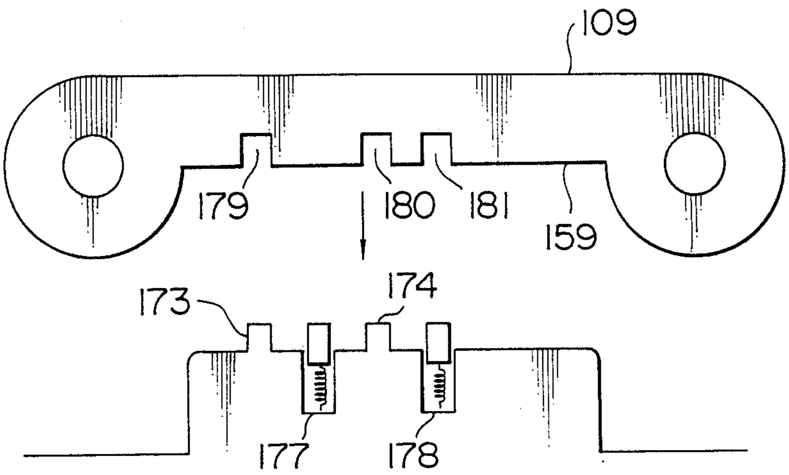

FIG. 30 shows an embodiment in which the holes 179, 180 and 181 are formed by providing notches in the underside of the cassette 109. This embodiment is suitable for use in such a case that the cassette is inserted into the thermal transfer-type printer from the upper side thereof. Thus, in the described embodiment, notches are formed in the lower side of one of the bridge portions of the cassette 109 as viewed in FIG. 30 so as to provide holes 179, 180 and 181 which indicate the characteristics of the inked sheet in the cassette 109, while the printer is provided with insertion prevention pins 173, 174 which project upward as viewed in FIG. 30, as well as switches 177, 178 adapted for cooperation with these pins 173, 174. The construction and operation of this embodiment are substantially the same as those of the embodiment shown in FIG. 26 so that detailed description is omitted in this regard. The arrangement shown in FIG. 30 makes it possible to realize a thermal transfer-type printer 105 into which the cassette 109 is inserted from the upper side, thus increasing the degree of freedom of the mechanical portion of the thermal transfer-type printer.

Figure 31:
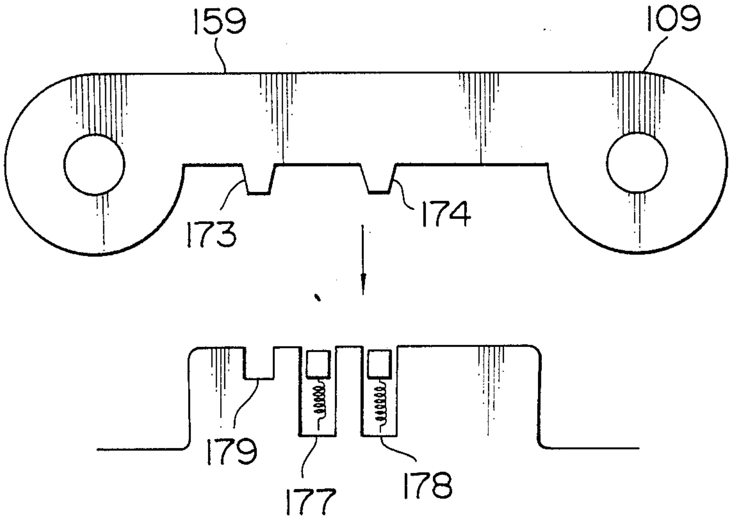

FIG. 31 shows an embodiment in which insertion prevention pins 173, 174 are constituted by projections formed on the underside of the cassette 109. This embodiment also is suitable for use in such a case that the cassette is inserted into the thermal transfer-type printer from the upper side thereof. Thus, in this embodiment, projections are formed in the underside of one of the bridge portions so as to constitute the insertion prevention pins 173, 174 while the printer 105 is provided with a hole 179 and switches 177, 178. The construction and operation are materially the same as those of the embodiment shown in FIG. 27 so that detailed description is omitted in this regard. The arrangement shown in FIG. 31 makes it possible to realize a thermal transfer-type printer 105 into which the cassette 109 is inserted from the upper side, thus increasing the degree of freedom of the mechanical portion of the thermal transfer-type printer.

Figure 32A:
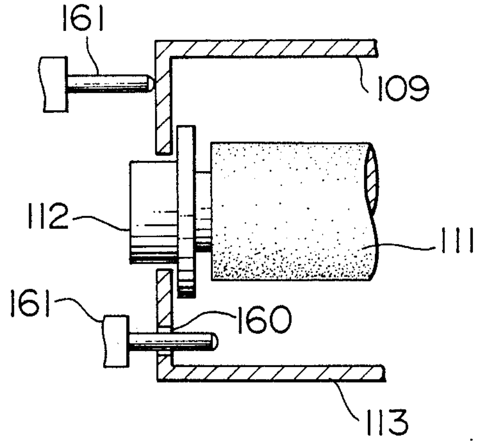
Figure 32B:
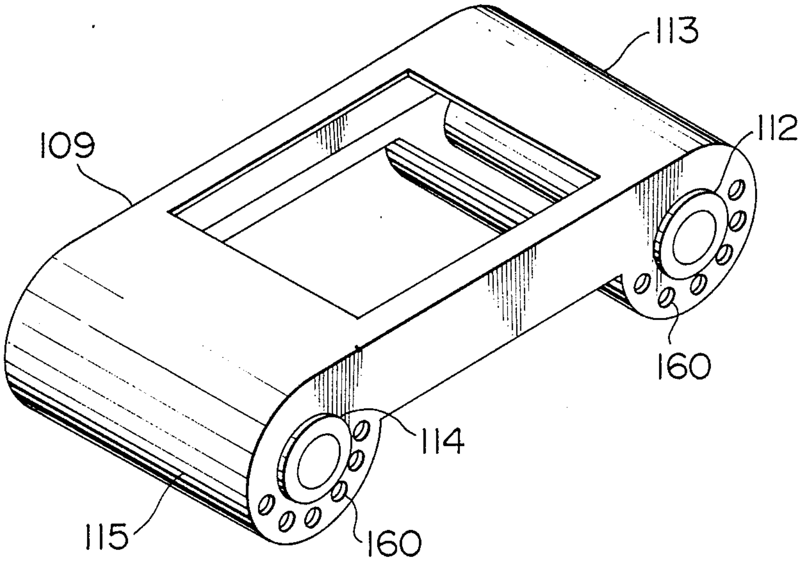

FIGS. 32A and 32B show an embodiment in which the characteristics indicating means 160 for indicating the characteristics of the inked sheet 111 is provided in an axial end of the supply reel housing portion 113 and/or the take-up reel housing portion 115.

In the illustrated case, as will be seen from FIG. 32B, holes constituting the characteristics indicating means are provided in one axial ends of the supply reel housing portion 115 and the take-up reel housing portion 115 so as to surround the supply reel 12 and the take-up reel 14, respectively. FIG. 32A schematically shows the cassette 109 mounted on the thermal transfer-type printer 105. The printer 105 is provided with characteristics reading means in the form of a plurality of pins 161. The pins 161 which face the characteristics indicating holes 160 can be received by these holes 160 but other pins 161 abut the wall of the cassette 109 so as to activate the switch of the characteristics reading means shown in FIG. 26 or so as to inhibit the mounting of the cassette 109 on the thermal transfer-type printer 109. Some of the preceding embodiment having the characteristics indicating means provided on a bridge portion 159 of the cassette 109, e.g., the embodiment shown in FIG. 9, has a drawback in that, when the user has happened to insert a wrong cassette 109 which is not designed to adapt to the thermal transfer-type printer 105, the cassette 109 is elastically deformed so that the cassette 109 may be forcibly inserted wrongly or broken if an excessive force is applied to the cassette 109. This problem, however, is overcome by the embodiment shown in FIGS. 32A and 32B because in this embodiment the characteristics indicating means 160 are provided on the axial end of the supply reel housing portion 113 and/or the take-up reel housing portion 115 which is comparatively rigid against externally applied insertion force.

Figure 33:
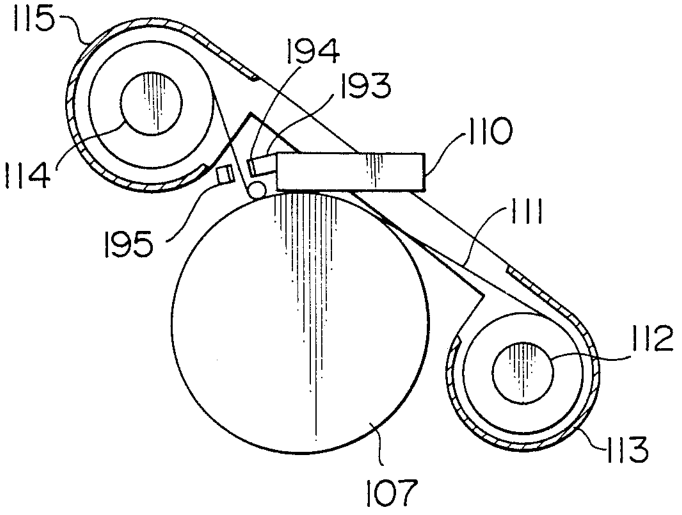
FIG. 33 is an illustration of the position of mounting a detection means for discriminating the color of the inked sheet.

FIG. 33 shows an example of the mechanical portion of a thermal transfer-type printer 105 which is capable of locating the inked sheet 111 upon discriminating the color of the inked sheet 111.

The construction of this arrangement is substantially the same as that shown in FIG. 2 so that detailed description thereof is omitted. It is to be understood, however, that this arrangement has a color filter 194 and an ink indexing sensor 193 which are carried by the thermal head so that the color of the portion of the inked sheet 111 facing the inked sheet indexing sensor 193 is discriminated by the inked sheet indexing sensor 193, thus measuring the position of the inked sheet 111. If necessary, the inked sheet 111 is fed in accordance with the result of the measurement of the position so as to bring the portion of another color to the printing position. Thus, in this embodiment, the indexing of the inked sheet 111 is conducted upon detection of a change in the color of the inked sheet 111, thus ensuring that colors are correctly selected in the multi-color printing in which images of three or four colors are superposed.

Figure 34:
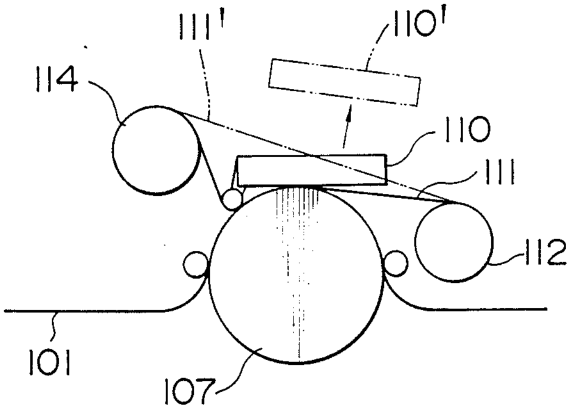
FIG. 34 is a side elevational view of a part of a printer required to discriminate of the color of the inked sheet.

FIG. 34 illustrates another example of the thermal transfer-type printer 105. In this embodiment, the print paper 101 is not completely wound around the drum 107 but is held in contact with a substantially half of the entire circumference of the drum 107, while the leading and trailing portions of the print paper 107 hang from the drum 107. As is the case of the preceding embodiment, the print paper 101 is fed in accordance with the rotation of the drum 107, while the thermal head 110 heats the ink on the inked sheet 111 so as to transfer the ink to the print paper 101 thereby recording information. In this embodiment, however, the thermal head is raised to a position denoted by 110' when printing in a first color is completed, and the drum 107 is reversed to feed the print paper 101 back to the initial position. Meanwhile, the inked sheet 11 is taken up by the take-up reel 114 so that the leading end of the portion of the inked sheet 111 carrying a second color is brought to the printing position. Thereafter, the thermal head 110 is lowered to the position indicated by 110 so as to heat and press the inked sheet 111 onto the print paper 110, thereby recording the information in the second color. This embodiment therefore essentially requires means for indexing and locating the inked sheet 111 for each color.

Figure 35A:
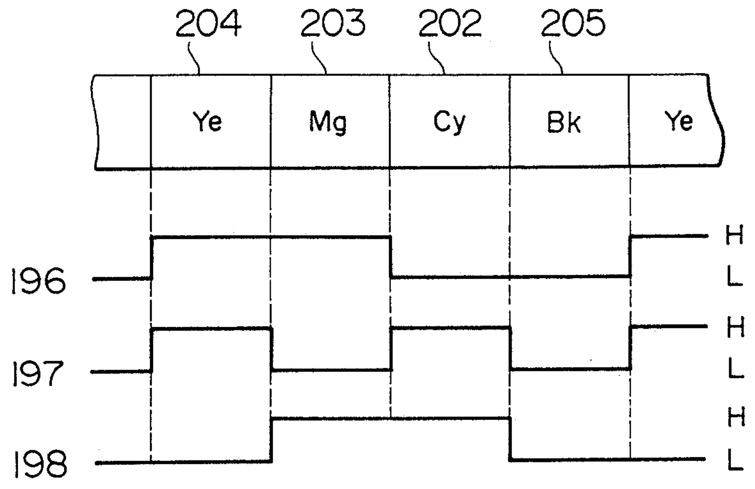
FIGS. 35A, 35B, 36A, 36B, 37A, 37B, 38A, 38B and 38C are illustrations of a method for discriminating the color of the inked sheet.

A description will be made hereinunder as to the manner in which the color of the liked sheet 111 is discriminated by means of the color filter 194, with reference to FIGS. 35A and 35B.

It is assumed that the inked sheet 111 has regions of three primary colors Ye, Mg and Cy, as well as a region of black Bk. The colors are read by sensors through a filter of R, G and B colors which are colors complementary to the Ye, Mg and Cy colors, the result of which is shown in FIG. 35A. Due to the color mixing effect produced by the G and B lights, the light transmitted through the Cy ink produces a sensor output of high level (referred to as "H") when it is sensed through the G and B filters and a sensor output of low level (referred to as "L") when sensed through the R filter. The result of the reading of the light transmitted through the Ye ink is that the R filter sensor 196 and the G filter sensor 197 produce outputs H, while the B filter sensor 198 produces an output L. Similarly, results as shown in FIG. 35A are obtained when lights through the Mg, Cy and black inks are read. In this case, therefore, it is possible to discriminate four colors by selecting filters of two different colors and using two sensors.

Figure 35B:
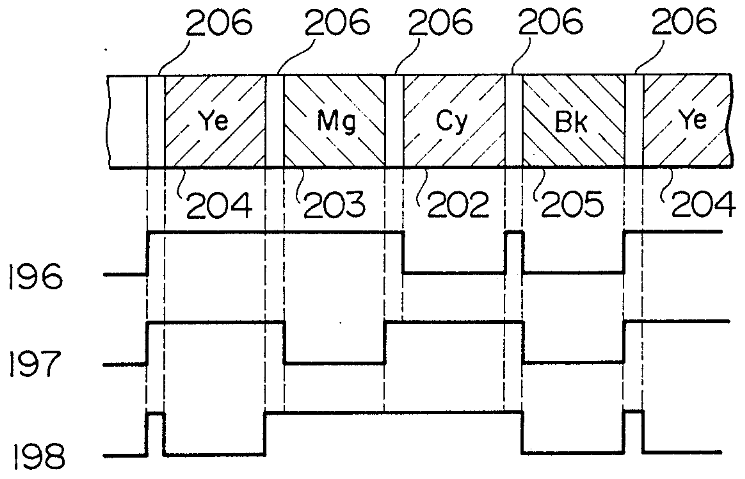

FIG. 35B shows the result of reading of five colors on an inked sheet, i.e., Ye, Mg, Cy, black and transparent portion, by means of tri-color filters of R, G and B colors. More specifically, the portions of four colors of Ye, Mg, Cy and black, and the transparent portion 206 are read by an R filter sensor 196, a G filter sensor 197 and a B filter sensor 198 which provide outputs as shown in FIG. 35B, so that five colors including transparency can be discriminated by filters of three different colors.

Figure 36A:
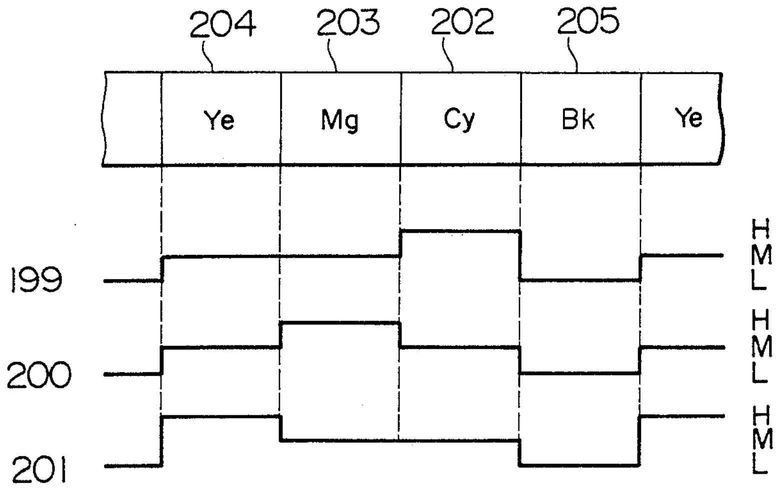
Figure 36B:
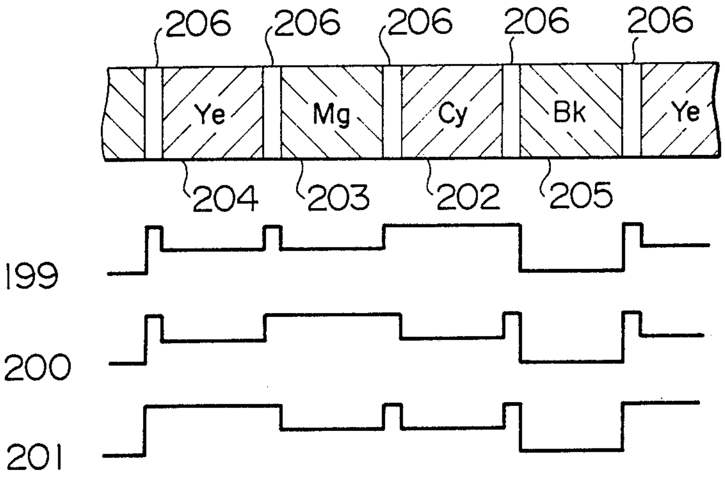

FIGS. 36A and 36B show the manner in which the Cy, Mg and Ye colors on the inked sheet 111 of FIG. 35 are read and discriminated by filters of the corresponding colors Cy, Mg and Ye.

More specifically, FIG. 36A shows the result of reading of the inked sheet 111 having four color portions Ye, Mg, Cy and black by means of sensors having filters of three different colors of Cy, Mg and Ye. In this case, when the Cy ink is read by the sensor having the Cy filter, the sensor produces the output H, while, when the black ink is read, the sensor produces an output L. When the Mg ink is read by the sensor having the Cy filter, the Cy filter passes only the B light out of R and B lights which constitute the Mg color, so that the sensor produces an output voltage which is ½ of the H level. Although not shown, in this embodiment, the sensor outputs are evaluated by output level judging means having two different threshold levels so as to be sorted into three types of H. M and L (H>M>L) Thus, outputs M are obtained when the Ye ink portion 204 is read by the Cy filter sensor 199 and the Mg filter sensor 200, whereas, when the Ye ink portion 204 is read by the Ye filter sensor 201, an output H is obtained. Similarly, outputs of different levels are obtained when the Mg ink portion 203, Cy ink portion 202 and the black ink portion 205 are read by the respective sensors. In this embodiment, therefore, it is possible to discriminate four different colors by means of two types of filter sensors. The black ink portion 205 provides an output L for all the filter sensors 199, 200 and 201. It is, therefore, effective to conduct the printing by using the black ink 205 as a reference because in such a case the print can be commenced by monitoring only one filter sensor.

FIG. 36B shows the result of reading of five color portions including Ye, Mg, Cy, black and transparency on the inked sheet 111 by sensors having corresponding colors Ye, Mg and Cy. In this case, it is possible to discriminate above-mentioned five portions of different colors including the transparency, by means of three filter sensors 199, 200 and 201 of different colors. The transparent portion 206 provides an output of H level for all the filter sensors 199, 200 and 201. The transparent portion 206 therefore can be detected by at least two filter sensors so that it can easily be used as the reference in the printing.

Figure 37A:
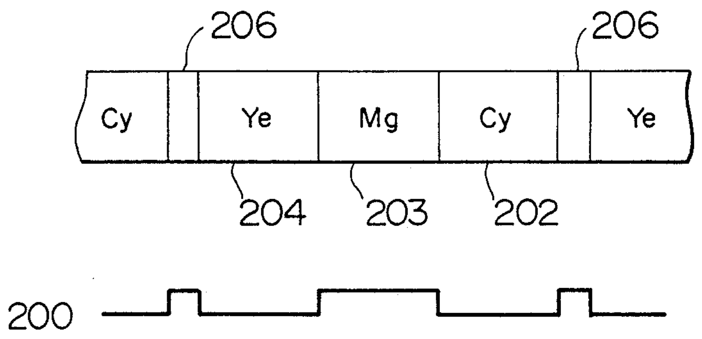
Figure 37B:
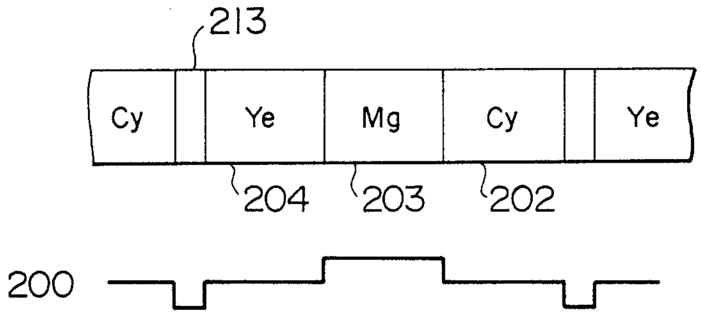

FIGS. 37A and 37B show an embodiment in which makes use of an inked sheet 111 having consecutive and repetitional regions of three primary colors Ye, Mg and Cy, and the reading is conducted by a filter sensor 200 having a filter of one of these three primary colors which is in this case Mg.

The inked sheet 111 shown in FIG. 37A is characterized in that a transparent region 206 carrying no ink is provided between the Cy ink region 202 and the Ye ink region 204. In this case, outputs H are obtained when the transparent region 206 and the Mg ink region 203 are read, respectively, while outputs M are obtained when the Ye ink region 204 and the Cy ink region 202 are read, respectively. Since the color ink regions are provided on the order of Ye, Mg and Cy, the output level is changed as H to M, M to H and H to M alternatingly each time different ink regions are read. It is advisable to select the length of the transparent region 206 to be much smaller than that of other inked regions 202, 203 and 204. In such a case, the transparent region 206 can be detected without fail through the detection of the length. By using the transparent region as the reference, it is possible to accurately index the inked sheet and, therefore, to exactly bring the desired color to the printing position.

The inked sheet 111 shown in FIG. 37B is basically the same as that shown in FIG. 37A, except that the transparent region 206 in the inked sheet of FIG. 37A is substituted by a space mark 2313 inked with a black ink or a green ink which is complementary to the color of the Mg filter 200. The result of the reading of the inked sheet 111 by the Mg filter 200 is the same as that explained in connection with FIG. 37A except that an output L is obtained when the space mark 213 is read. Since only the space mark 213 provides an output of L level, it is possible to detect the space mark 213 without fail. In addition, the change in the output level appears without fail each time a different color region is read. It is thus possible to detect the change in the color of the inked sheet 111 without fail so as to ensure that the printing is conducted with a high degree of accuracy. Although the space mark 213 may be formed with black ink as described, this is not exclusive and the space mark 213 may be formed by superposing three types of inks Ye, Mg and Cy. The green space mark 213 mentioned above can also be realized by superposing Cy and Ye inks.

Figure 38A:
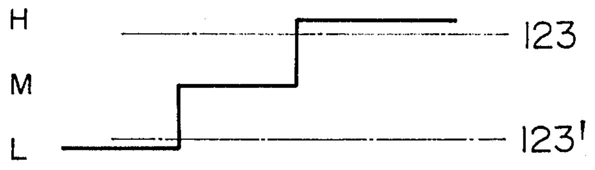
Figure 38B:
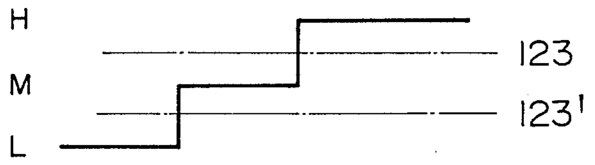
Figure 38C:
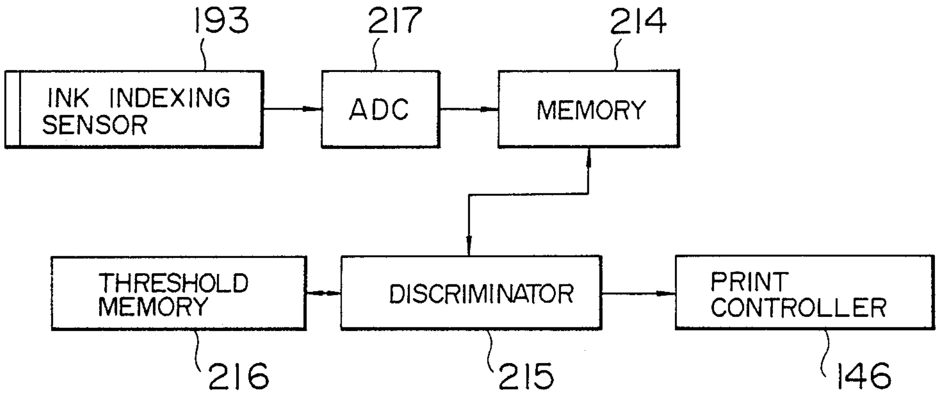

FIGS. 38A to 38C show an embodiment in which the threshold level 123 for A/D converting the output from the ink indexing sensor 193 shown in FIG. 36 is changed in accordance with the state of the inked sheet, thereby executing compensation for the fluctuation in level of the sensor output attributable to a change in the conditions such as environmental condition, type of the inked sheet and characteristics of the individual inked sheets.

In the case of a method illustrated in FIG. 38A, the output of the inked sheet indexing sensor 193 is read and evaluated by means of threshold levels 123, 123' preset in the thermal transfer-type printer 5. In this case, as will be seen from FIG. 38A, the output levels can scarcely be discriminated by the preset threshold levels 123, 123'. This method, however, involves a risk that the reading is failed particularly when the level of the output of the inked sheet indexing sensor 193 is fluctuated by a greater amount, with the result that the colors on the inked sheet cannot be read correctly. In this embodiment, therefore, the waveform of the output from the inked sheet indexing sensor 193 is minutely A/D converted during printing on a first sheet, and the maximum threshold levels are determined from such waveform.

FIG. 38B shows an example in which the output from the indexing sensor is evaluated by optimum threshold levels 123, 123' determined by the A/D conversion explained above. In this case, the threshold level 123 is set midst between the H and M levels, while the other threshold level 123' is set midst between the M and L levels. FIG. 38C is a block diagram of a system employed in this embodiment for changing the A/D threshold levels. The output signal from the inked sheet indexing sensor 193 is A/D converted at a high resolution by an A/D converter 217 and the digital waveform thus obtained is stored in a memory 214. The waveform stored in the memory 214 is read by a discriminating means 215 which evaluates the read waveform by means of a preset threshold stored in a threshold memory 216 so as to discriminate the read color on the inked sheet. The discrimination means 215 then issues an instruction for enabling the print controller 146 to index the inked sheet so as to bring the portion of the inked sheet of the desired color to the printing position, or to commence the printing in the read color. After the completion of one cycle of the printing operation, the discrimination means 215 sets a new threshold in accordance with the content of the memory 214 so as to write the new threshold in the threshold memory 216. In the next cycle of the printing operation, the discrimination of color is executed in accordance with the new threshold levels, whereby any failure attributable to erroneous reading of color is avoided.

Figure 39:
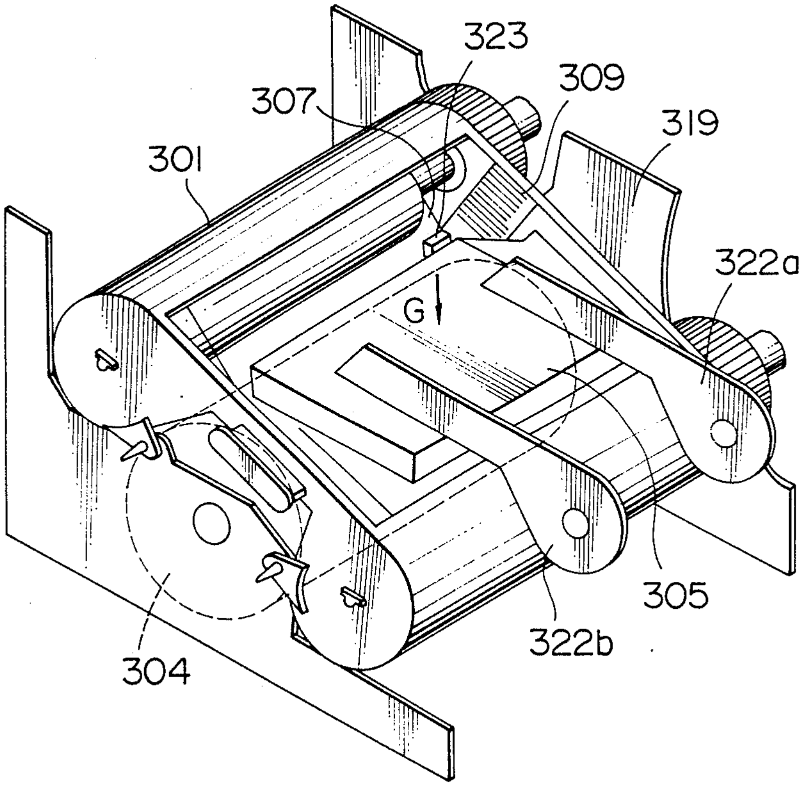
FIG. 39 and FIG. 40 are illustrations of an arrangement in which a detecting portion provided on a movable part of the printer scans a record region on the cassette in which are recorded characteristics of the ink so as to read the information.

FIG. 39 shows a cassette 301 of the present invention mounted in a cassette mounting portion 319 of a thermal transfer-type printer. In this embodiment, the thermal head 305 is adapted to be moved down as indicated by an arrow G, as head supporting members **322*a*, 322*b* supporting the thermal head 305 are swing by, for example, a D.C. motor through worm gears. Thus, the thermal head 305 can move into a space in the cassette 301 so as to press a print paper onto a platen roller 304 through an inked sheet 307. The thermal head 323 is provided at its end with a photo-reading sensor 323 which scans a record portion 309 on the cassette 301, thereby reading the information concerning the inked sheet. The rotation of the thermal head 305** is conducted automatically so that its rotation speed can be controlled substantially constant so that the scanning speed also can be maintained substantially constant.

Figure 40:
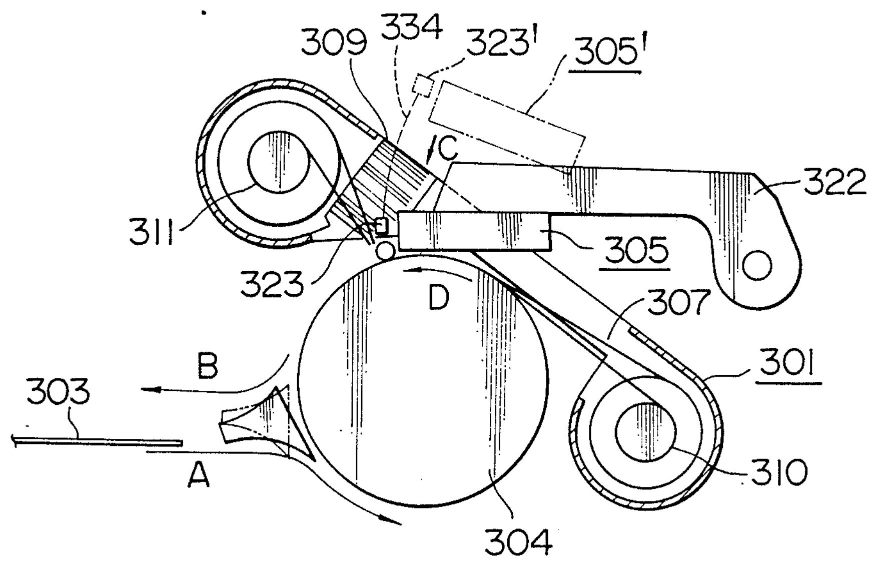
Figure 41:
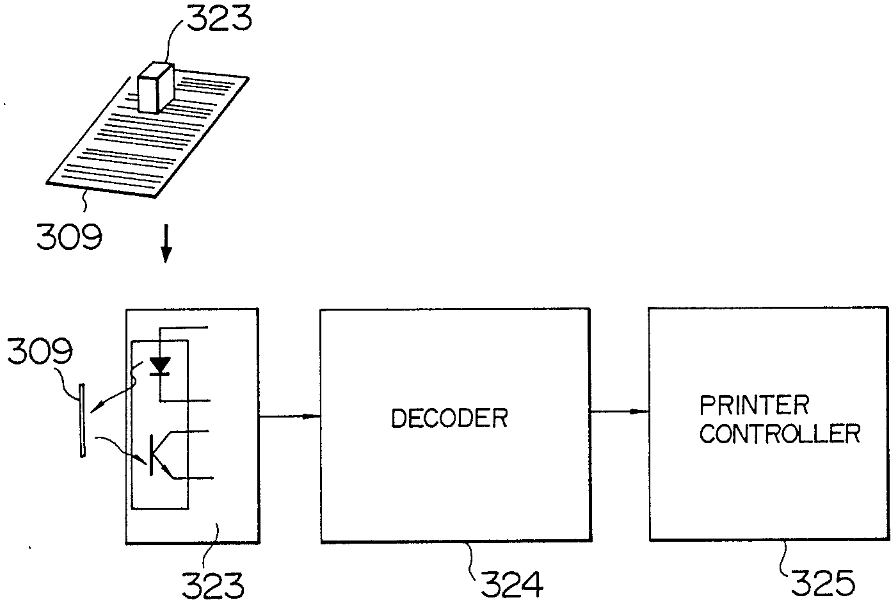
FIG. 41 is a block diagram of a circuit for reading information.

FIG. 40 illustrates the state in which the record portion 309 is scanned by the photo-reading sensor 323 on the thermal head.

Referring to FIG. 40, the thermal head 305 is first set at the position shown by broken line as denoted by 305′ and, when the cassette 301 is mounted, the head support members **322*a*, 322*b* are swung in the direction of arrow C as explained before in connection with FIG. 39 from the broken-like position 305′ to the solid-line position denoted by 305. In this state, the photo-reading sensor 323 on the thermal head 305 scans the record portion 399 along a curved broken line 334 starting from a point 323**′, thereby reading the information recorded in the record portion.

The record reading portion includes the photo-reading sensor 323 adapted to scan the surface of the record portion 309 thereby to read the information recorded in the record portion 309. The photo-reading sensor 323 may be constituted by an LED and a photo-sensor. The information signal output from the photo-reading sensor 323 is sent to a signal decoder 324 so as to be decoded into a digital signal which is delivered to the print controller 325 so as to be used for various controlling purposed in the printing. The information pattern recorded in the record portion 309 in the illustrated case is constituted by a striped bar code pattern. This, however, is not exclusive and other types of record pattern may be used for recording the information. When a bar code pattern is used, the type of the bar code pattern may be selected from various types of known information coding patterns such as NRZ, RZ, NRZI, AMI and CMI. Thus, the information to be transmitted is recorded in the form of successive white and black line patterns. In the illustrated embodiment, the record pattern is read at a constant reading speed so that the reading is conducted accurately even when the recording density is high, with minimized occurrence of reading error. The decoding of the information signal within the printer controller 325 can easily be conducted by, for example, a program stored in a microcomputer, so that the decoding method is not described in this case.

Figure 42:
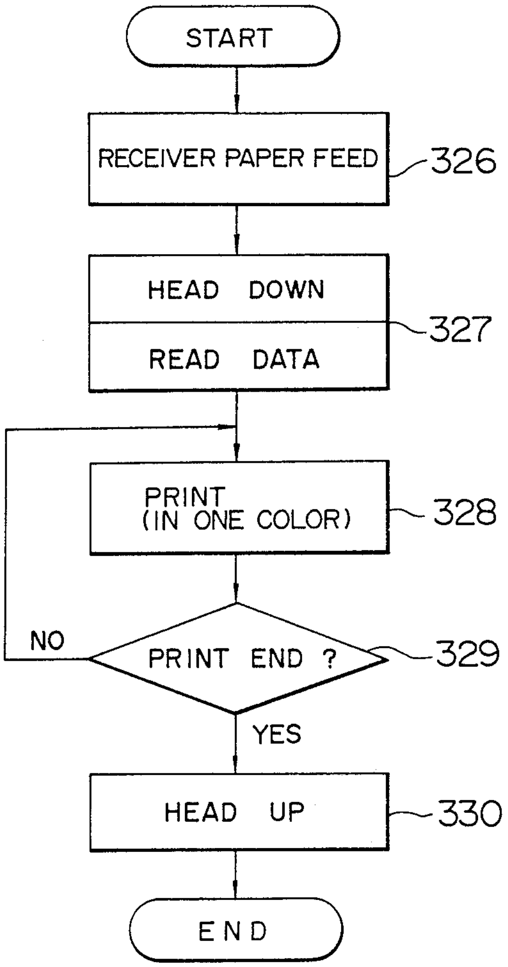
FIG. 42 is a flow chart illustrating the operation for reading the information.

FIG. 42 is a flow chart illustrating the operation of an embodiment of the thermal transfer-type printer of the present invention.

As the printing operation is started, the print paper (receiver paper) is taken into the printer and fed in Step 326. Then, a head-down operation is executed to press the thermal head onto the platen roller in Step 327. During the head-down operation, the information recorded on an inner surface of the cassette frame is read by a sensor provided on the thermal head. Then, printing is executed to form an image corresponding to one picture frame in Step 328 and the printing is repeated with inks of different colors as the printing operation is executed cyclically. In Step 329, a judgement is conducted in all the colors. If the answer is NO, i.e., when the printing has not been finished in some colors or color, the process returns to Step 328 in so that the printing operation is repeated until printing in all the colors is finished. After confirming the completion of the printing in all the colors, the print paper is ejected and a head-up operation is executed to raise the thermal head in Step 330, thus completing a series of printing operation.

As will be understood from the foregoing description, in this embodiment of the present invention, the information concerning the inked sheet is read without fail before the start of the printing in a first color in the process for recording an image in a multiplicity of colors. The reading of the information is carried out without fail whenever the cassette is exchanged so that the printer can get the correct information concerning the newly mounted inked sheet.

Figure 43:
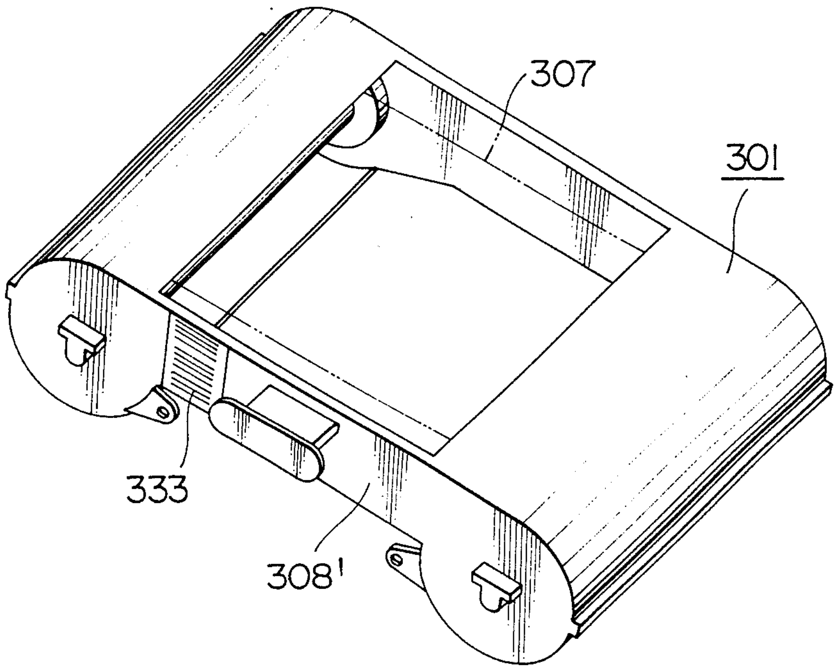
FIG. 43 is a perspective view illustrating an arrangement in which the record region is provided on the outer side of the cassette.

FIG. 43 is a perspective view of a different embodiment of the ink sheet cassette in accordance with the present invention. The cassette generally denoted by 301 accommodates an inked sheet 307 and has an outer wall surface 308′ on which is adhered a record 333 having a record of desired information in the form of optically white and black pattern.

Figure 44A:
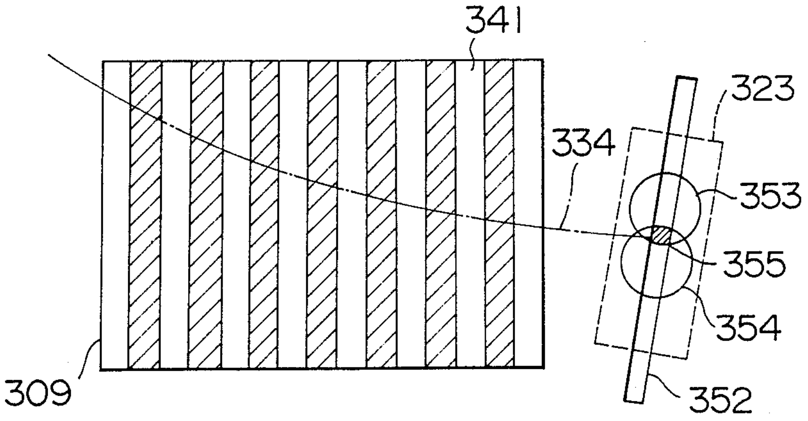
FIGS. 44A, 44B and 44C are illustrations of a method for scanning the record region and a method for reading data.
Figure 44B:
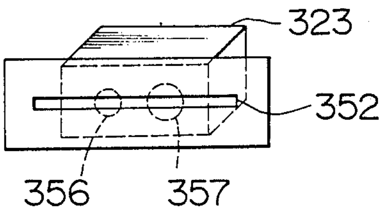
Figure 44C:
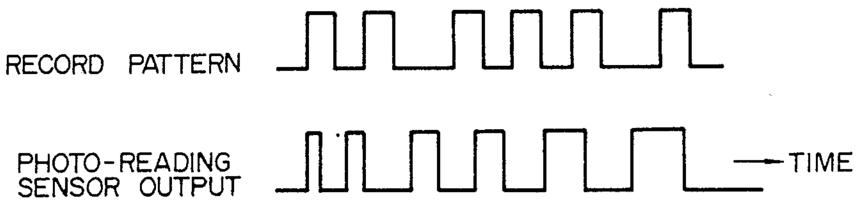

FIGS. 44A to 44C illustrate the reading operation performed by a reading unit. More specifically, FIG. 44A is an enlarged illustration of the record 309, FIG. 44B is a schematic illustration of a photo-reading sensor, and FIG. 44C is an illustration of the output from an optical reading sensor and actual record pattern.

Referring first to FIG. 44A, the record 309, which corresponds to the record 33 in FIG. 43, has a record pattern 341 constituted by white and black parallel lines. The record 309 is adapted to be scanned by the photo-reading sensor 323 along a chain line 334. As will be seen from FIG. 44B, the photo-reading sensor 323 has a sensor window 356 and a source window 357 formed in a wall of a box. These windows 356, 357 have a sensing area 353 and an illuminating are 354 which are independent from each other, as will be seen from FIG. 44A. In this embodiment, a slit 352 is provided in front of the photo-reading sensor 323 so that the aperture diameter of the photo-reading sensor 323 for scanning the record pattern 341 is restricted as shown in FIG.

44A. More specifically, the area over which the sensing area 353 and the illuminating area 354 overlap each other is restricted by the slit 352, and this restricted area as hatched in FIG. 44A constitutes the actual sensing area 353. In other words, the photo-reading sensor is sensitive only to the light from the hatched area 353 so that the record pattern 341 can be read without cross-talk. FIG. 44C shows the difference between the pattern of output from the photo-reading sensor 323 and the actual record pattern. The actual record pattern is formed at a constant pitch in terms of bit, whereas the interval between the adjacent high level portions of the photo-reading sensor output is irregular due to the fact that the sensor 323 scans the record pattern along an arc as shown in FIG. 44A. Thus, the analysis of the output from the photo-reading sensor 323 is rather difficult to conduct. The compensation for the irregularity would be possible through a suitable arithmetic operation, provided that the locus of scan of the photo-reading sensor is known. In this embodiment, however, the problem concerning the difficulty in the analysis of the output from the photo-reading sensor 323 is overcome by virtue of the following features.

Figure 45:
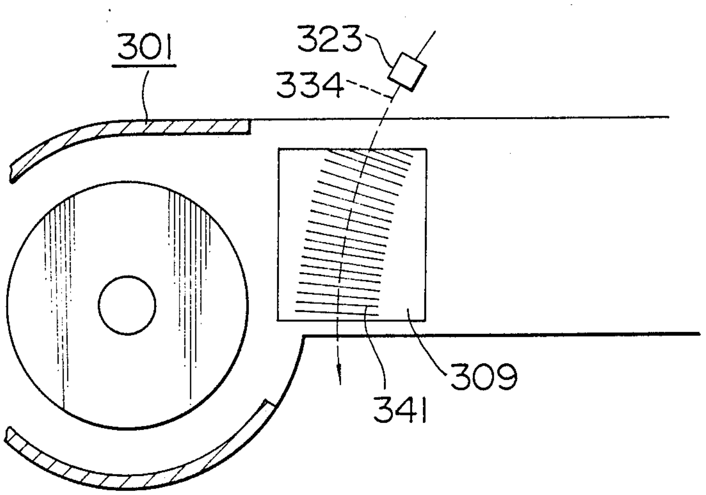
FIGS. 45 and 46 are front elevational views illustrating manners in which records are made in the record region.

FIG. 45 is an illustration of a record pattern formed on the record portion designed and arranged in consideration of the characteristics of the reading portion on the printer. A record 309 carrying information concerning the nature of the inked sheet 307 is adhered to the cassette 301, and is adapted to be scanned by the photo-reading sensor 323 so that the information is read. As shown in FIG. 40, the photo-reading sensor 323 is provided on the thermal head 305 which in turn is supported and moved by a head support member 322 which is adapted to swing about a fixed point. In consequence, the photo-reading sensor 323 scans the record 309 along an arcuate path 334 as shown in FIG. 45. In this embodiment, the black and white lines or stripes constituting the record pattern 341 are arranged in such a radial form that each line or stripe orthogonally crosses the arcuate path 334 of the photo-reading sensor 323. Although in the illustrate case the photo-reading sensor 323 moves along a simple arcuate path, the printer may be designed such that the photo-reading sensor 323 moves along an S-shaped or other complicated path. In such a case, the lines or stripes constituting the record pattern are arranged that each of the successive lines or stripes orthogonally crosses such a path of movement of the photo-reading sensor.

Figure 46:
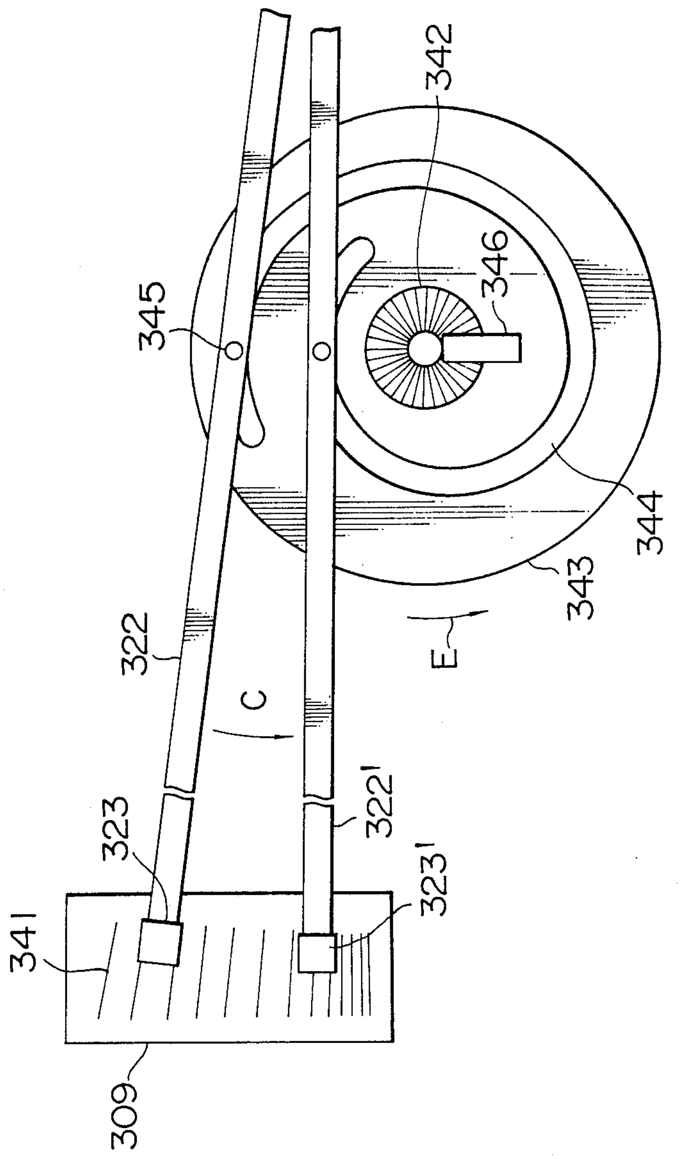

FIG. 46 illustrates an embodiment in which the printer is designed to produce FG pulses which are synchronous with the record pattern. A head supporting member 322 provided at its end with a photo-reading sensor 323 is adapted to be moved up and down by means of a cam 343. More specifically, the head supporting member 322 has a guide rod 345 which is received in a cam groove 344 in the cam 343. As the cam 343 is rotated in the direction of an arrow E by, for example, a head motor which is not shown, the cam groove 344 also rotates to pull the guide rod 345 towards the center of the cam 343. As a result, the head supporting member 322 is moved in the direction of the arrow C so that the photo-reading sensor 323 is moved towards a position indicated at 323', while scanning the record pattern 341 on the record portion 309.

For the purpose of detecting the rotation speed of the cam 343, an FG pattern 342 is formed on the cam 343 and an FG sensor 346 is provided so as to be able to read the FG pattern 342. In an example of operation of this arrangement, the cam 346 is driven to rotate at a constant speed, so that the FG sensor 346 provides an output in the form of a pulse train having a constant interval or pitch of pulses. The photo-reading sensor 323, however, does not rotate at a constant speed because the moving speed thereof is ruled by the contour of the cam groove 344. The irregular movement of the photo-reading sensor 323, however, can be exactly reproduced insofar as the same cam contour is utilized. In this embodiment, the interval of the lines or stripes of the record pattern 341 is progressively varied inconformity with the irregular moving speed of the photo-reading sensor 323. In other words, the interval of the pattern is so determined that the photo-reading sensor 323 moves one step of the record pattern each time the FG sensor 346 produces a pulse. Thus, in this embodiment, the variation in the scanning speed caused by a specific contour of the cam groove 344 is compensated for by the record pattern 341, whereby the record pattern 341 and the specification of the cam groove 344 correctly correspond to each other. It will be understood that, in this embodiment, the reading of the record pattern is conducted accurately even when the rotation speed of the cam 343 is not constant. Obviously, the FG pattern and the FG sensor 346 can be omitted if it is ensured that the reading is conducted at a regular time interval under the control of, for example, a microcomputer. Thus, the embodiment shown in FIG. 46 can be applied both to the case where the scanning is effected at a constant speed and the case where the scanning speed is varied during the scanning.

Figure 47:
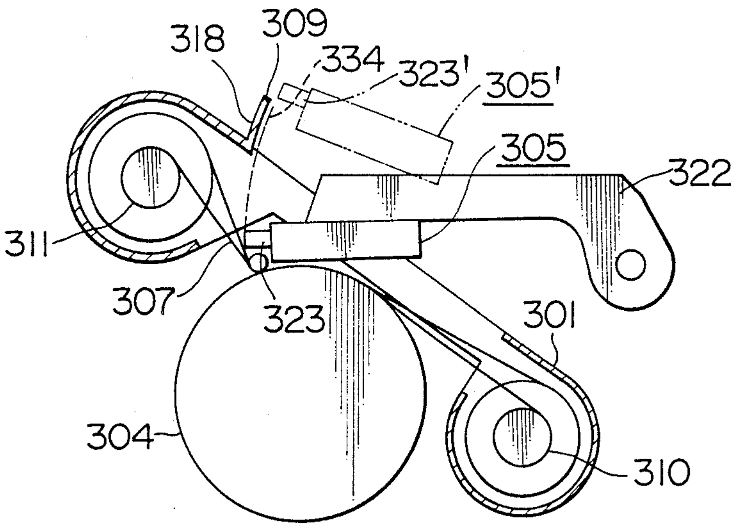
FIGS. 47 and 48 are side elevational views of examples of an arrangement having a record mounting portion on the cassette in which information is read by the inked sheet reading sensor from the record region.

FIG. 47 illustrates a different embodiment of the inked sheet cassette of the present invention. This inked sheet cassette is used in combination with a printer incorporating a thermal head 305 which is provided at its end with an optical reading sensor 323. In the down-state of the thermal head 305, i.e., when the thermal head 305 is held in close contact with a platen roller 304, the photo-reading sensor 323 serves as an indexing sensor which scans the inked sheet 307 so as to sense an indexing mark similar to that explained before in connection with FIG. 33.

The cassette shown in FIG. 47 is provided with a record mounting portion 318 which is projected from the body of the cassette 301, and a record portion 309 is adhered to the record mounting portion 318. As the thermal head 305 moves from the position shown by a broken line 305' to the position shown by solid line, the photo-reading sensor 323 also is moved from the broken-line position 323' to the solid-line position across the record portion 309, thus scanning the record portion so as to acquire data from the record portion 309.

As will be understood from the foregoing description, the embodiment shown in FIG. 47 is advantageous in that the photo-reading sensor 323 on the printer can also serve as an indexing sensor for indexing the inked sheet, thus contributing to a reduction in the production cost of the printer.

Figure 48:
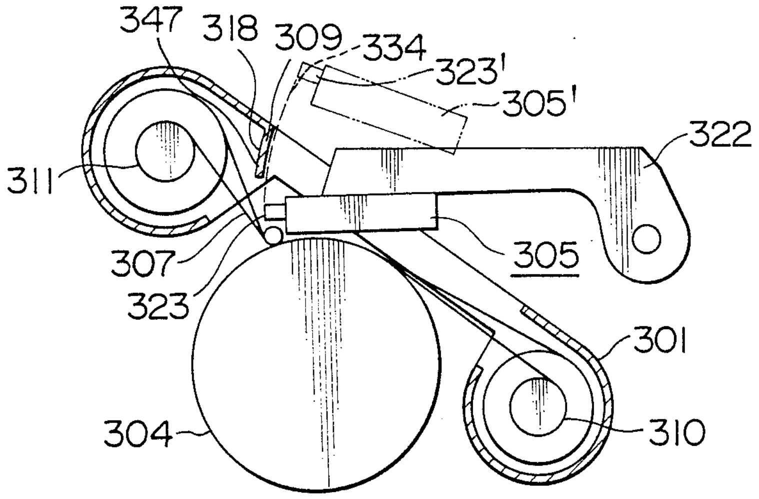

FIG. 48 shows a different embodiment. This embodiment is similar to the embodiment shown in FIG. 47 in that the photo-reading sensor 323 provided on the thermal head 305 serves also as an indexing sensor for indexing the inked sheet. In this embodiment, however, the record mounting portion 318 on the cassette 301 is formed so as to project inwardly of the cassette 301. The inwardly projecting record mounting portion 318 is protected against breakage or contamination attributable to contact with other parts of the printer, and prevent any foreign matters and contaminants from coming into the cassette, thus preventing contamination. The inwardly projecting record mounting portion 318, however, poses produces a problem in that, the inked sheet 307 stretched between a supply reel 310 and a take-up reel 311 undesirably contacts the record mounting portion 318 after the demounting of the cassette 301 from the printer. In the embodiment shown in FIG. 48, therefore, the lower end portion 347 is finished to provide a smooth surface so that it serves as a presser for pressing the inked sheet 307. In consequence, the inked sheet is protected from damage and, at the same time, undesirable wrinkling of the inked sheet 307 is avoided.

As will be understood from the foregoing description, the present invention offers various advantages as summarized below.

Firstly, it is to be noted that the invention makes it possible to load a wider inked sheet than the conventional ink sheet, while using the same ink sheet cassette, so that a greater printing area is obtained as compared with the conventional inked sheet cassette. In addition, a single cassette is provided with a plurality of sets of locating holes so that it can be adapted to a printer capable of printing an image in a greater scale, without losing adaptability to ordinary conventional printers. The window or windows provided in the side surface of the cassettes enables the user to visually check the amount of unused inked sheet in the cassette. Since the window or windows are formed in the side wall of the cassette, introduction of dusts and other foreign matters into the cassette is effectively prevented so as to avoid any degradation of the print quality attributable to contamination. Furthermore, the characteristics indicator holes provided in the bridge portion between the supply reel housing portion and the take-up reel housing portion of the cassette makes it possible to transmit data or information concerning the type and characteristics of the inked sheet in the cassette by a simple reading system. In a printer embodying the present invention, the printer is designed to read marks provided on the reverse side of the print paper and representing the type and characteristics of the print paper. Thus, the printer can conduct the printing under conditions which are optimum for the type and characteristics of the inked sheet in the cassette which is now on the printer, whereby a high quality of the print is ensured. When any wrong print paper is used, the printer automatically detects such a print paper and operates to suspend the printing operation, thus preventing any erroneous operation of the printer attributable to the use of a wrong print paper. In addition, information concerning the type and characteristics of the inked sheet is transmitted to the printer by a cooperation between characteristics indicator holes and projections formed on the cassette and the printer so that the printer is allowed to operate under condition which are optimum for the inked sheet now used, thus assuring a high quality of the print. The characteristics indicator holes and the projections also cooperate in rejecting any wrong inked sheet, thus preventing any erroneous operation attributable to the use of the wrong inked sheet. The printer also is capable of detecting the exact position of the print paper within the printer, through reading marks provided on the reverse side of the print paper or the leading end of the print paper. It is therefore possible to commence the printing exactly from the expected position on the print paper. The printer of the invention also is capable of conducting multi-color printing accurately because the images of different colors are accurately superposed by virtue of the correct indexing of the multi-color inked sheet which owes to the discrimination of the color on the inked sheet performed by photo-sensors combined with color filters.

In a specific form of the printer of the present invention, a record portion carrying coded information concerning the type and characteristics of the inked sheet is adhered to the inked sheet cassette. The record portion is scanned by a reading unit which is provided on a movable arm supporting the thermal head, so that even complicated information can be sent from the cassette to the printer without substantial difficulty. The record portion may be formed as an adhesive sheet carrying a coded record pattern formed beforehand by, for example, printing. With such an adhesive tape-sheet record portion, it is possible to obtain characteristics indication means simply by adhering the sheet to the inked sheet cassette, without requiring alteration of molds and other works necessary for forming different patterns of characteristics indication holes or notches. The invention also makes it possible to provide the record portion inside the cassette so that the printer can always read the information correctly without being affected by contamination of the record portion.

What is claimed is:

1. An inked sheet cassette comprising a cassette case encasing an inked sheet constituted by a thin web-like film or paper sheet with at least one type of ink applied thereto, and a pair of reels disposed in said cassette case including a supply reel and a take-up reel on which are wound the respective end sides of said inked sheet, a window being provided at least in one of a portion of said cassette case adjacent to said supply reel and a portion of said cassette case adjacent to said take-up reel so as to enable the user to visually check the diameter of a roll of said inked sheet on said reel adjacent to said window, said window comprising an opening extending over a region of said cassette case opposite to an end face and a side face of one of said supply and take-up reels.

2. An inked sheet cassette according to claim 1, wherein said cassette case is provided with a plurality of individual locating holes which are offset in the direction of width of said ink sheet, each of the locating holes being adapted to receive a locating member of a specific thermal transfer-type recording apparatus defined by a print width thereof.

3. An inked sheet cassette according to claim 1, wherein said cassette case has a plurality of characteristics indicator holes indicative of coded information concerning the characteristics of said inked sheet in said cassette.

4. An inked sheet cassette according to calim 1, wherein said cassette case has a plurality of characteristics indicator projections indicative of coded information concerning characteristics of said inked sheet in said cassette.

5. An inked sheet cassette comprising a cassette case encasing an inked sheet constituted by a thin web-like film or paper sheet with at least one type of ink applied thereto, and a pair of reels disposed in said cassette case and including a supply reel and a take-up reel on which are wound the respective end sides of said inked sheet, a window being provided at least in one of a portion of said cassette xase adjacent to said supply reel and a portion adjacent to said take-up reel so as to enable the user to visually check the diameter of a roll of said inked sheet on said reel adjacent to said window, said cassette case having characteristics indicator holes indicative of coded information concerning the characteristics of said inked sheet in said cassette, wherein said characteristics indicator holes comprise a plurality of hole portions formed in said cassette case and a seal member provided to selectively cover said hole portions.

6. An inked sheet cassette according to claim 5, further comprising a locating member for locating said seal member on said cassette case.

7. A thermal transfer-type recording apparatus in which an inked sheet held by a supply reel and a take-up reel in an ink sheet cassette case and a specific print paper are superposed and selectively heated by a thermal head so that the ink on said inked sheet is selectively transferred to said print paper thereby to record information on said print paper, wherein said cassette case has a window at least in one of a portion of said cassette case adjacent to said supply reel and a portion of said cassette case adjacent to said take-up reel so as to enable the user to visually check the diameter of a roll of said inked sheet on said reel adjacent to said window, said window comprising an opening extended over a region of said cassette case opposite to an end face and a side face of one of said supply and take-up reels.

8. A thermal transfer-type recording apparatus according to claim 7, wherein said cassette case is provided with a plurality of individual locating holes which are offset in the direction of width of said ink sheet, each of the locating holes being adapted to receive a locating member of a specific thermal transfer-type recording apparatus defined by a print width thereof.

9. A thermal transfer-type recording apparatus according to claim 7, wherein said cassette case has a plurality of characteristics indicator holes indicative of coded information concerning the characteristics of said inked sheet in said cassette, and said apparatus further comprises reading means capable of reading the information represented by said plurality of characteristics indicator holes to control the printing operation in accordance with the read information.

10. A thermal transfer-type recording apparatus according to claim 7, wherein said print paper is provided on the reverse side thereof with binary coded marks indicative of the type of said print paper and clock marks at regular intervals, wherein said apparatus further comprises a reading device including a first sensor means for reading said clock marks and a second sensor means for reading said binary coded marks simultaneously with the first sensor means, said recording device being adapted to carry out sampling of an output of the second sensor means synchronously with a change in an output of the first sensor means to thereby control the printing operation in accordance with the reading of said binary coded marks.

11. A thermal transfer-type recording device according to claim 7, wherein said inked sheet cassette casing has characteristics indicating means comprised of at least one of a plurality of projections and a plurality of holes indicative of information concerning the type of said inked sheet, said apparatus further comprising reading means for reading the information carried by said characteristics indicating means to control the printing operation in accordance with the result of said reading, said reading means being capable of rejecting any cassette of specification which do not meet the specification of said printer.

12. A thermal transfer-type recording apparatus according to claim 7, further comprising a plurality of photo-sensor means having a plurality of different color filters thereon, color discriminating means for discriminating the color of said inked sheet in accordance with an output from each of said plurality of photo-sensor means, and print control means for changing a print control operation in accordance with an output from said color discriminating means.

13. A thermal transfer-type recording apparatus according to claim 7, wherein said cassette case is provided with a bridge portion interconnecting reel housing portions housing said reels, said bridge portion being provided with a characteristics indicating means including a binary code printed on at least one of said cassette and a sheet adhered to said cassette for indicating information concerning the type of said inked sheet in said cassette, said apparatus further comprising reading means provided on a movable member movable in relation to the printing operation, said reading means being capable of scanning said characteristics indicating means in accordance with the movement of said movable member so as to read said information carried by said characteristics indicating means.

14. A thermal transfer-type recording apparatus according to claim 7, wherein said cassette case has a plurality of characteristics indicator projections indicative of coded information concerning the characteristics of said inked sheet on said cassette, and said apparatus further comprises reading means capable of reading the information represented by said plurality of characteristics indicator projections to control the printing operation in accordance with the read information.

15. A thermal transfer-type recording apparatus according to claim 7, further comprising a plurality of sets of light sources and photo-sensors, each light source and photo-sensor set selectively delivers and responds to a single color of light associated therewith, and color discriminating means for discriminating the color of said inked sheet in accordance with outputs from said photo-sensors.

16. A thermal transfer-type recording apparatus according to claim 7, wherein an inked sheet cassette having ink therein includes a characteristics indicator hole indicative of information of the type of said inked sheet said apparatus including a projection at a position corresponding to the characteristics indicator hole to prohibit the loading of inked sheet cassettes in accordance with the absence of said characteristics indicator hole.

17. A thermal transfer-type recording apparatus according to claim 7, wherein an inked sheet cassette having ink therein selectively includes a characteristics indicator projection indicative of information of the type of said inked sheet, said projection contacting with the recording apparatus in order to prohibit the loading of the inked sheet cassette.

18. A thermal transfer-type recording apparatus according to claim 16, wherein said characteristics indicator hole is included on inked sheet cassettes containing a predetermined type of ink and said characteristics indicator hole is not included on inked sheet cassettes containing an ink different from said predetermined type.

19. A thermal transfer-type recording apparatus according to claim 17, wherein said characteristics indicator projection is included on cassettes containing ink of a predetermined type.

20. A thermal transfer-type recording apparatus in which an inked sheet held by a supply reel and a take-up reel in an ink sheet cassette and a specific print paper are superposed and selectively heated by a thermal head so that the ink on said inked sheet is selectively transfereed to said print paper thereby to record information on said print paper, wherein said cassette case has a window at least in one of a portion adjacent to said supply reel and a portion adjacent to said take-up reel so as to enable the user to visually check the diameter of a roll of said inked sheet on said reel adjacent to said window, said cassette case having characteristics indicator holes indicative of coded information concerning the characteristics of said inked sheet in said cassette, and said apparatus further comprises reading means capable of reading the information represented by said characteristics indicator holes to control the printing operation in accordance with the read information, wherein said characteristics indicator holes comprise a plurality of hole portions formed in said cassette case and a seal member provided to selectively cover said hole portions.

21. A thermal transfer-type recording apparatus according to claim 20, further comprising a locating member for locating said seal member on said cassette case.

22. A thermal transfer-type recording apparatus in which an inked sheet held by a supply reel and a take-up reel in an ink sheet cassette case and a specific print paper are superposed and selectively heated by a thermal head so that the ink on said inked sheet is selectively transferred to said print paper thereby to record information on said print paper, wherein said cassette case includes a window at least in one of a portion adjacent to said supply reel and a portion adjacent to said take-up reel so as to enable the user to visually check the diameter of a roll of said inked sheet on said reel adjacent to said window, and wherein said print paper is provided on the reverse side thereof with indexing marks for indexing and locating said print paper, while said apparatus is provided with reading means capable of reading said indexing marks on both sides of the heat-generating means of said thermal head in the vicinity thereof so as to face the reverse side of said print paper, said apparatus further comprising control means for recognizing the position of said print paper from the output of said indexing mark reading means so as to enable the apparatus to commence the printing operation from the correct position on said print paper.

23. A thermal transfer-type recording apparatus according to claim 22, further comprising reading means capable of detecting the leading end of said print paper and provided on both sides of the heat-generating means of said thermal head in the vicinity thereof so as to face the reverse side of said print paper, and control means for recognizing the position of said print paper from the output of said indexing mark reading means so as to enable the printer to commence the printing operation from the correct position on said print paper.

* * * * *